United States Patent
Ozue et al.

(10) Patent No.: US 6,243,240 B1
(45) Date of Patent: *Jun. 5, 2001

(54) NON-CONTACT TYPE TRANSMISSION DEVICE AND ROTARY MAGNETIC HEAD UNIT HAVING THE NON-CONTACT TYPE TRANSMISSION DEVICE

(75) Inventors: Tadashi Ozue; Toshio Shirai; Tomohiro Ikegami, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,528

(22) Filed: Dec. 16, 1997

(30) Foreign Application Priority Data

Dec. 17, 1996 (JP) .................................................. 8-336900
Dec. 17, 1996 (JP) .................................................. 8-336901
Apr. 25, 1997 (JP) .................................................. 9-109506

(51) Int. Cl.$^7$ ................................. G11B 5/02; G05B 1/06
(52) U.S. Cl. .................................... 360/281.4; 360/281.2; 360/281.3; 318/640
(58) Field of Search .............................. 360/108, 84, 66; 318/640, 97, 16

(56) References Cited

U.S. PATENT DOCUMENTS

| | | | |
|---|---|---|---|
| 4,821,132 | * 4/1989 | Hasegawa | 360/108 |
| 4,875,110 | * 10/1989 | Kazama et al. | 360/64 |
| 5,036,418 | * 7/1991 | Willmann et al. | 360/108 |
| 5,587,859 | * 12/1996 | Nagatsuka | 360/108 |
| 5,637,973 | * 6/1997 | Hirai et al. | 318/640 |
| 5,675,449 | * 10/1997 | Sano et al. | 360/77.16 |
| 5,701,103 | * 12/1997 | Fujii | 330/290 |
| 5,739,986 | * 4/1998 | Vlerken et al. | 360/108 |

FOREIGN PATENT DOCUMENTS

| | | |
|---|---|---|
| 57-074807 | 5/1982 | (JP) . |
| 58-185020 | 10/1983 | (JP) . |
| 1-128509 | * 5/1989 | (JP) . |
| 2-267703 | 11/1990 | (JP) . |
| 5-314403 | * 11/1993 | (JP) . |
| 7-192203 | 7/1995 | (JP) . |

* cited by examiner

Primary Examiner—Brian E. Miller
(74) Attorney, Agent, or Firm—Sonnenschein, Nath & Rosenthal

(57) ABSTRACT

A rotary magnetic head unit has a non-contact type transmission device capable of reliably performing non-contact transmission both in signal and power supply systems and designed so as to be smaller in size. The non-contact type transmission device is formed of a rotating member and a fixed member each having a power supply wiring section for transmitting a power supply, a signal wiring section for transmitting a signal, and a crosstalk prevention section positioned between the power supply wiring section and the signal wiring section to prevent crosstalk between these sections. If a reproducing head formed of a magnetoresistive element is used by being supplied with a bias current from the power supply transmitted by the power supply wiring sections of the rotary and fixed members, the rotary magnetic head unit uses bias current control means to change the bias current supplied to the reproducing head according to the amount of wear of the recording head during reproduction from signals from magnetic tapes.

11 Claims, 25 Drawing Sheets

FIG. 9

|  | MODE A | MODE B |
|---|---|---|
| RECORDING HEAD WH | IN CONTACT WITH MAGNETIC TAPE | NOT IN CONTACT WITH MAGNETIC TAPE |
| OSCILLATING OPERATION FOR POWER SUPPLY (OSCILLATOR 41) | OFF | ON |
| CROSSTALK TO RECORDING | ZERO | ZERO |

NON-CONTACT TYPE TRANSMISSION DEVICE AND ROTARY MAGNETIC HEAD UNIT HAVING THE NON-CONTACT TYPE TRANSMISSION DEVICE

BACKGROUND OF THE INVENTION

1. Field of the Invention

The present invention relates to a non-contact type transmission device for use in an information recording apparatus, e.g., a video tape recorder and to a rotary magnetic head unit having the non-contact type transmission device.

2. Description of the Related Art

Video tape recorders, tape streamers and so on are known as apparatuses for recording information on a magnetic tape and for reproducing information from the magnetic tape. An information recording apparatus of this kind has a rotary magnetic head unit for a recording signal on a magnetic tape and for reproducing a signal recorded on a magnetic tape.

The rotary magnetic head unit has a rotating drum and a fixed drum. The rotating drum has a recording head and a reproducing head. The recording head is a head for recording a signal on a magnetic tape, and the reproducing head is used to reproduce a signal recorded on a magnetic tape.

The rotating drum holds the recording head and the reproducing head and rotates relative to the fixed drum by the operation of a motor to scan a magnetic tape with the recording head or the reproducing head by, for example, the helical scanning method, thereby recording information on the magnetic tape or reproducing information from the magnetic head.

If such a helical scanning system is used, signals can be recorded on a magnetic tape at a high density and the relative speed between the magnetic tape and the magnetic head can be increased.

The helical scanning type rotary magnetic head unit needs to transmit signals and electric power between the rotating drum and the fixed drum in a non-contact manner since the recording head and the reproducing head are accommodated in the rotating drum. For example, there is a need to transmit a reproduction signal, which is obtained by the reproducing head, from the rotating drum side to the fixed drum side in a non-contact manner, and to supply electric power from the fixed drum side to a circuit board provided on the rotating drum side.

Conventional rotary magnetic head units of this kind use a rotary transformer for a non-contact signal transmission system only and require another rotary transformer for power supply if non-contact power supply is necessary. A signal system rotary transformer and a power supply rotary transformer are separately provided in such conventional magnetic head units in order to prevent crosstalk of a transmitted signal used with the power supply rotary transformer to the signal system rotary transformer.

This "crosstalk" is a leak of a signal through a leakage magnetic field between adjacent signal and power supply systems or between different signal systems.

Rotary magnetic head units having two rotary transformers, however, are large in size and high in manufacturing cost. Also, it is technically difficult to incorporate two rotary transformers in a small rotary magnetic head unit.

A magnetoresistive element head (MR head) is used as a head for reproducing information recorded on a magnetic recording medium. A reproducing magnetoresistive element head constantly requires a bias current when operated to obtain a reproduction signal. A magnetoresistive element head is a head in which a change in resistance is caused by a change in magnetic field, and in which a change in signal magnetic field (input signal) is converted into a change in resistance to be extracted as a change in reproduction output signal.

Such a magnetoresistive element head can be used advantageously as a reproducing head because of its ability to obtain a stable reproduction output signal independent of the magnetic tape speed.

In using a reproducing magnetoresistive element head of this kind by causing a bias current to flow continuously therethrough during reproduction, there is a problem relating to wear of the magnetoresistive element head. That is, as the total of time periods through which a magnetoresistive element head is operated to reproduce signals from magnetic tapes, the amount of wear of the head increases inevitably. With wear of the head, a change occurs in signal reproduction characteristics of the magnetoresistive element head. A suitable reproduction output signal cannot be obtained unless the bias current is changed according to wear of the head.

SUMMARY OF THE INVENTION

In view of the above-described circumstances, an object of the present invention is to provide a non-contact type transmission device in which both non-contact transmission in a signal system and non-contact transmission of power supply can be reliably performed, and which can be reduced in size, and a rotary magnetic head unit having the non-contact type transmission device.

Another object of the present invention is to provide a rotary magnetic head unit in which, in using a reproducing magnetic head formed of a magnetoresistive element, the bias current for the head can be controlled according to wear of the head so as to optimize a reproduction signal output from the reproducing head.

To achieve the above-described objects, according to the present invention, there is provided a non-contact type transmission device for transmitting a power supply and a signal between a rotating member and a fixed member in a non-contact manner, the transmission device comprising the rotating member having a rotating member power supply wiring section for transmitting a power supply, a rotating member signal wiring section for transmitting a signal, and at least one rotating member crosstalk prevention section for preventing crosstalk between the rotating member power supply wiring section and the rotating member signal wiring section, the rotating member crosstalk prevention section being positioned between the rotating member power supply wiring section and the rotating member signal wiring section, and the fixed member having a fixed member power supply wiring section for transmitting a power supply between itself and the rotating member power supply wiring section, a fixed member signal wiring section for transmitting a signal between itself and the rotating member signal wiring section, and at least one fixed member crosstalk prevention section for preventing crosstalk between the fixed member power supply wiring section and the fixed member signal wiring section, the fixed member crosstalk prevention section being positioned between the fixed member power supply wiring section and the fixed member signal wiring section.

In the transmission device in accordance with the present invention, on the rotating member side, the rotating member crosstalk prevention section is positioned between the rotating member power supply wiring section and the rotating member signal wiring section to prevent crosstalk between these two sections. Similarly, on the fixed member side, the fixed member crosstalk prevention section is positioned between the fixed member power supply wiring section and the fixed member signal wiring section to prevent crosstalk between these sections.

If one non-contact type transmission device thus arranged is used, power supply transmission and signal transmission can be performed simultaneously while power supply-signal crosstalk is prevented or reduced. The non-contact transmission device can therefore be designed so as to be smaller in size.

According to the present invention, the rotating member and the fixed member are disk-like members opposed to each other or cylindrical members coaxial with each other.

Preferably, according to the present invention, a plurality of rotating member crosstalk prevention sections are provided on the rotating member side, and, correspondingly, a plurality of fixed member cross-talk prevention sections are provided on the fixed member side, thereby preventing crosstalk more reliably.

According to another aspect of the present invention, there is provided a rotary magnetic head unit for recording a signal on an information recording medium in the form of a tape and for reproducing a signal from the information recording medium, the rotary magnetic head unit comprising a non-contact type transmission device having a rotating member and a fixed member and capable of transmitting a power supply and a signal between the rotating member and the fixed member in a non-contact manner, a rotating drum on which the rotating member of the transmission device is supported, a fixed drum on which the fixed member of the transmission device is supported, the rotating member of the transmission device having a rotating member power supply wiring section for transmitting a power supply, a rotating member signal wiring section for transmitting a signal, and at least one rotating member crosstalk prevention section for preventing crosstalk between the rotating member power supply wiring section and the rotating member signal wiring section, the rotating member crosstalk prevention section being positioned between the rotating member power supply wiring section and the rotating member signal wiring section, and the fixed member of the transmission device having a fixed member power supply wiring section for transmitting a power supply between itself and the rotating member power supply wiring section, a fixed member signal wiring section for transmitting a signal between itself and the rotating member signal wiring section, and at least one fixed member crosstalk prevention section for preventing crosstalk between the fixed member power supply wiring section and the fixed member signal wiring section, the fixed member crosstalk prevention section being positioned between the fixed member power supply wiring section and the fixed member signal wiring section.

In the rotary magnetic head unit having the rotating and fixed drums in accordance with the present invention, on the rotating member side in the transmission device, the rotating member crosstalk prevention section is positioned between the rotating member power supply wiring section and the rotating member signal wiring section to prevent crosstalk between these two sections. Similarly, on the fixed member side, the fixed member crosstalk prevention section is positioned between the fixed member power supply wiring section and the fixed member signal wiring section to prevent crosstalk between these two sections.

If one non-contact type transmission device thus arranged is used, power supply transmission and signal transmission can be performed simultaneously while power supply-signal crosstalk is prevented or reduced. The non-contact transmission device can therefore be designed so as to be smaller in size.

According to the present invention, the rotating member and the fixed member are disk-like members opposed to each other or cylindrical members coaxial with each other.

Preferably, according to the present invention, a plurality of rotating member crosstalk prevention sections are provided on the rotating member side, and, correspondingly, a plurality of fixed member crosstalk prevention sections are provided on the fixed member side, thereby preventing crosstalk more reliably.

Preferably, the transmitted signal comprises a recording signal supplied to a recording head and a reproduction signal obtained by a reproducing head, and the power supply is used for amplification of the reproduction signal obtained by the reproducing head, thus enabling amplification of the reproduction signal from the reproducing head in the rotating drum.

According to the present invention, the operation of an external oscillator for producing the power supply is stopped when the recording head is in contact with the information recording medium, thereby preventing crosstalk to the recording head operating for recording.

Also, according to the present invention, a maximum frequency band of an alternating current from the external oscillator for the power supply is set different from the frequency band of the signals, thereby prevent crosstalk from the power supply side to the signal side.

Preferably, according to the present invention, the rotating member signal wiring section is connected directly to the recording head. The impedance of the recording signal system in a low frequency range is thereby reduced, so that the recording head and the rotary signal wiring section can function substantially as a short-circuit ring forming a crosstalk prevention section when a signal is reproduced with the reproducing head, thereby reducing crosstalk from the power supply side to the reproducing head. Also, the crosstalk prevention effect can be further improved by short-circuiting a subsection of the fixed member wiring section constituting the recording system at the time of reproduction Preferably, according to the present invention, the rotating member crosstalk prevention section is placed between a subsection of the rotating member signal wiring section for transmitting a recording signal and the rotating member power supply wiring section while the fixed member crosstalk prevention section is placed between the subsection of the fixed member signal wiring section for transmitting a recording signal and the fixed member power supply wiring section, thereby reliably preventing or reducing crosstalk between the signal wiring sections and the power supply wiring sections.

According to still another aspect of the present invention, there is provided a rotary magnetic head unit for recording a signal on an information recording medium in the form of a tape and for reproducing a signal from the information recording medium, the rotary magnetic head unit comprising a transmission device having a rotating member and a fixed member and capable of transmitting a power supply and signals between the rotating member and the fixed member in a non-contact manner, a plurality of recording heads for recording signals, at least one reproducing head for reproducing signals, a rotating drum on which the plurality of recording heads and the reproducing head are disposed, and on which the rotating member of the transmission device is supported, a fixed drum on which the fixed member of the transmission device is supported, the rotating member of the transmission device having a rotating member power supply wiring section for transmitting a power supply, a rotating member signal wiring section for transmitting signals, and at least one rotating member crosstalk prevention section for preventing crosstalk between the rotating member power supply wiring section and the rotating member signal wiring section, the rotating member crosstalk prevention section being positioned between the rotating member power supply wiring section and the rotating member signal wiring section, and the fixed member of the transmission device having a fixed member power supply wiring section for transmitting a power supply between itself and the rotating member power supply wiring section, a fixed member signal wiring section for transmitting signals between itself and the rotating member signal wiring section, and at least one fixed member crosstalk prevention section for preventing crosstalk between the fixed member power supply wiring section and the fixed member signal wiring section, the fixed member crosstalk prevention section being positioned between the fixed member power supply wiring section and the fixed member signal wiring section, wherein a subsection of the rotating member signal wiring section relating to a recording signal recorded by each of the recording heads is placed between the rotating member power supply wiring section and a subsection of the rotating member signal wiring section relating to a reproduction signal obtained by the reproducing head, and a subsection of the fixed member signal wiring section relating to a recording signal recorded by each of the recording heads is placed between the fixed member power supply wiring section and a subsection of the fixed member signal wiring section relating to a reproduction signal obtained by the reproducing head.

In this rotary magnetic head unit of the present invention, the plurality of recording heads for recording signals and the reproducing head for reproducing signals are disposed on the rotating drum, and the subsection of the rotating member signal wiring section relating to a recording signal supplied to each of the recording heads is placed between the rotating member power supply wiring section and the subsection of the rotating member signal wiring section relating to a reproduction signal from the reproducing head while the subsection of the fixed member signal wiring section relating to a recording signal supplied to each of the recording heads is placed between the fixed member power supply wiring section and the subsection of the fixed member signal wiring section relating to a reproduction signal from the reproducing head.

The rotating member crosstalk prevention section and the fixed member crosstalk prevention section, the rotating member signal wiring section relating to a recording signal supplied to each recording head and the fixed member signal wiring section relating to a recording signal supplied to each recording head serve to prevent occurrence of crosstalk between the rotating member power supply wiring section and the rotating member signal wiring section and occurrence of crosstalk between the fixed member power supply wiring section and the fixed member signal wiring section.

According to a further aspect of the present invention, there is provided a rotary magnetic head unit for recording a signal on an information recording medium in the form of a tape and for reproducing a signal from the information recording medium, the rotary magnetic head unit comprising a transmission device having a rotating member and a fixed member and capable of transmitting a power supply and signals between the rotating member and the fixed member in a non-contact manner, a plurality of recording heads for recording signals, at least one reproducing head for reproducing signals, a rotating drum on which the plurality of recording heads and the reproducing head are disposed, and on which the rotating member of the transmission device is supported, a fixed drum on which the fixed member of the transmission device is supported, the rotating member of the transmission device having a rotating member power supply wiring section for transmitting a power supply, and a rotating member signal wiring section for transmitting signals, and the fixed member of the transmission device having a fixed member power supply wiring section for transmitting a power supply between itself and the rotating member power supply wiring section, and a fixed member signal wiring section for transmitting a signal between itself and the rotating member signal wiring section, wherein a subsection of the fixed member signal wiring section relating to a recording signal recorded by each of the recording heads is placed between the fixed member power supply wiring section and a subsection of the fixed member signal wiring section relating to a reproduction signal obtained by the reproducing head.

In this rotary magnetic head unit of the present invention, the plurality of recording heads for recording signals and the reproducing head for reproducing signals are disposed on the rotating drum, and the subsection of the rotating member signal wiring section relating to a recording signal supplied to each of the recording heads is placed between the rotating member power supply wiring section and the subsection of the rotating member signal wiring section relating to a reproduction signal from the reproducing head while the subsection of the fixed member signal wiring section relating to a recording signal supplied to each of the recording heads is placed between the fixed member power supply wiring section and the subsection of the fixed member signal wiring section relating to a reproduction signal from the reproducing head.

The rotating member signal wiring section relating to a recording signal supplied to each recording head and the fixed member signal wiring section relating to a recording signal supplied to each recording head serve to prevent occurrence of crosstalk between the rotating member power supply wiring section and the rotating member signal wiring section and occurrence of crosstalk between the fixed member power supply wiring section and the fixed member signal wiring section.

According to still a further aspect of the present invention, there is provided a rotary magnetic head unit comprising a transmission device having a rotating member and a fixed member and capable of transmitting a power supply and a signal between the rotating member and the fixed member in a non-contact manner, a rotating drum on which the rotating member of the transmission device is supported, a fixed drum on which the fixed member of the transmission device is supported, a reproducing head for reproducing a signal recorded on a magnetic tape, the reproducing head being formed of a magnetoresistive element and supported on the rotating drum, the rotating member of the transmission device having a rotating member power supply wiring section for transmitting a power supply, and a rotating member reproduction signal wiring section for transmitting a reproduction signal obtained by the reproducing head, the fixed member of the transmission device having a fixed member power supply wiring section for transmitting a power supply between itself and the rotating member power supply wiring section, and a fixed member reproduction signal wiring section for transmitting a signal between itself and the rotating member reproduction signal wiring section, and bias current control means for changing a bias current which is supplied to the reproducing head during reproduction, and which is produced from a power supply transmitted by the rotating member power supply wiring section and the fixed member power supply wiring section, the bias current control means changing the bias current according to the amount of wear of the reproducing head during a time period through which magnetic tape signals are reproduced with the reproducing head.

In this rotary magnetic head unit of the present invention, a power supply used in the rotary drum can be transmitted between the rotating member power supply wiring section in the rotating member and the fixed member power supply wiring section in the fixed member, and a reproduction signal obtained by the reproducing head is transmitted between the rotating member reproduction signal wiring section in the rotating member and the fixed member reproduction signal wiring section in the fixed member.

From the power supply transmitted between the rotating member power supply wiring section and the fixed member power supply wiring section, the bias current to be supplied to the reproducing head formed of a magnetoresistive element on the rotating drum is obtained, thereby enabling the reproducing head to reproduce signals from the magnetic tape.

During reproduction, the bias current control means changes the bias current supplied to the reproducing head according to the amount of wear of the reproducing head, thereby making it possible to obtain the magnetic tape reproduction output signal in an optimum state no matter what the amount of wear of the reproducing head.

BRIEF DESCRIPTION OF THE DRAWINGS

FIG. 9 is a table showing the relationship between states of a recording head and states of an oscillator in a power system;

DESCRIPTION OF THE PREFERRED EMBODIMENTS

Preferred embodiments of the present invention will be described below in detail with reference to the accompanying drawings.

The embodiments of the present invention described below are presented with various suitable technical limitations of the invention because of their concrete forms. The scope of the present invention, however, is not restricted by such limitations.

Figure 1:
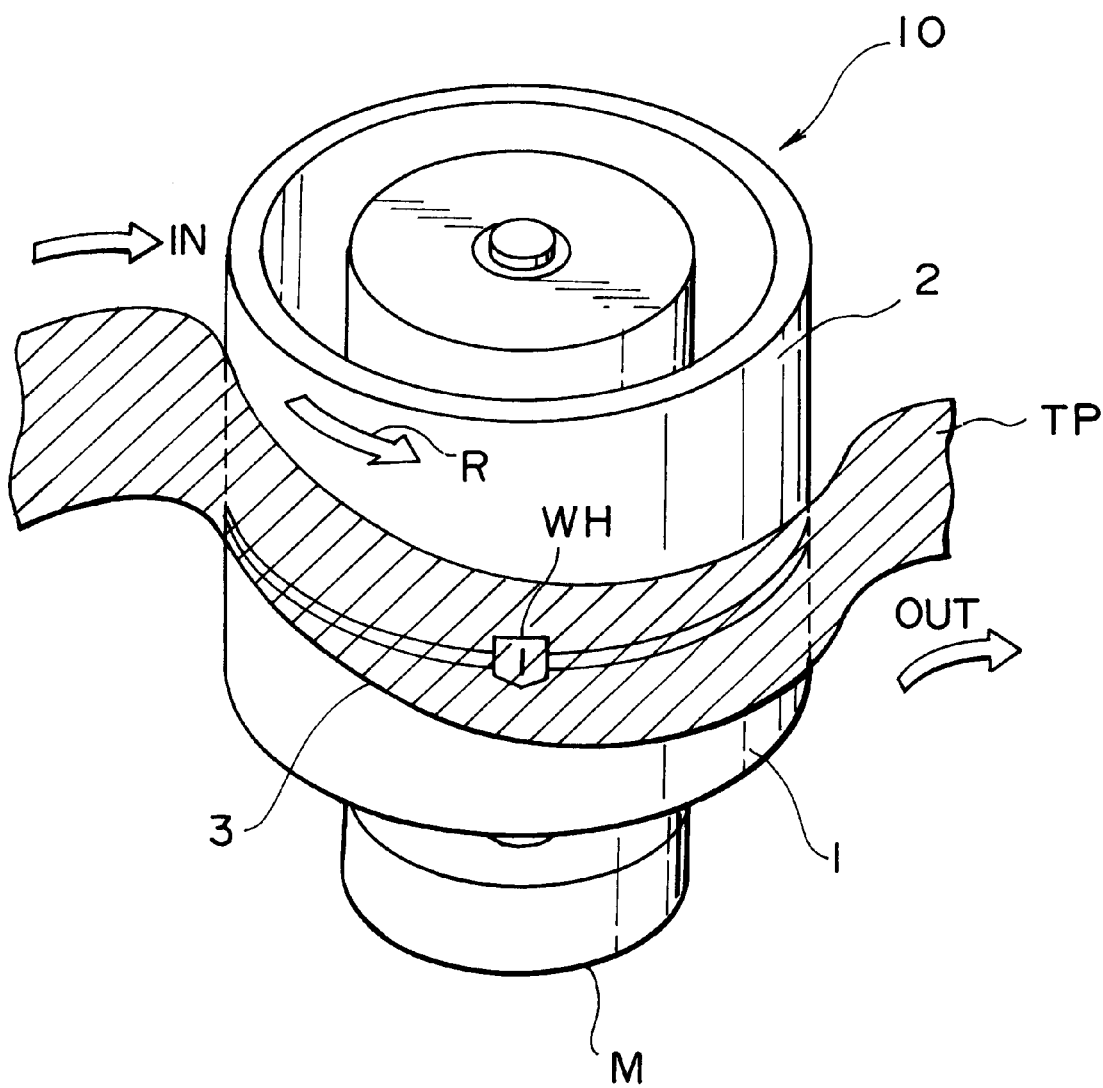
FIG. 1 is a perspective view of a rotary magnetic head unit which has a non-contact type transmission device, and which represents an embodiment of the present invention.

FIG. 1 shows a rotary magnetic head unit 10 which has a non-contact transmission device, and which represents a preferred embodiment of the present invention.

Figure 2:
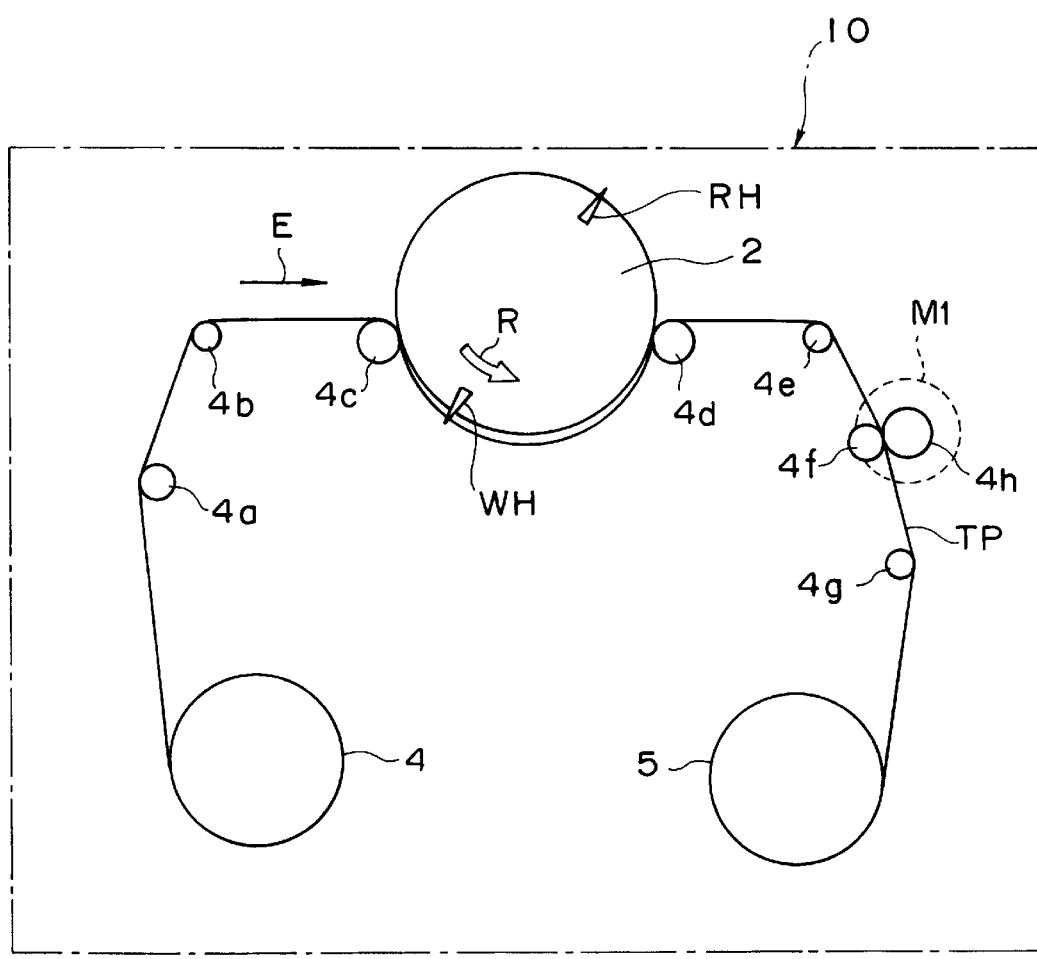
FIG. 2 is a schematic plan view of an information recording apparatus having the rotary magnetic head unit shown in FIG. 1.

FIG. 2 shows an example of an information recording apparatus having the rotary magnetic head unit 10.

The magnetic head unit 10 shown in FIGS. 1 and 2 is applied to a video tape recorder, a data streamer, a digital audio system or the like to be used to record signals on a magnetic tape TP, which is a recording medium in the form of a tape, and to reproduce information recording on the magnetic tape TP.

The magnetic head unit 10 shown in FIGS. 1 and 2 has a fixed drum 1, a rotating drum 2 and a motor M.

The rotating drum 2 has a reproducing head RH and a recording head WH. The reproducing head RH and the recording head WH have a phase difference of 180° from each other. The rotating drum 2 rotates in the direction of arrow R relative to the fixed drum 1 by the operation of the motor M. The rotating drum 2, the recording head WH and the reproducing head RH rotate in the direction R. The magnetic tape TP is obliquely fed from an inlet side IN to an outlet side OUT in a tape feed direction E along a lead guide portion 3 of the fixed drum 1.

In the information recording apparatus shown in FIG. 2, the magnetic tape TP is fed from a supply reel 4 along the path formed by the supply reel 4, and rollers 4a, 4b, and 4c, closely wrapped about the rotating drum 2 and the fixed drum 1 through an angle of about 180°, and is moved via rollers 4d, 4e, 4f, and 4g to be wound up around a take-up reel 5. A capstan 4h is provided so as to face the roller 4f and is rotated by a capstan motor M1.

Simultaneously with this tape feeding, the motor M is operated to rotate the rotating drum 2 in the direction R, thereby guiding the recording head WH and the reproducing head RH in contact with the magnetic tape TP in a helical scanning manner. The magnetic tape TP runs obliquely along the lead guide portion 3 of the fixed drum 1.

Figure 3:
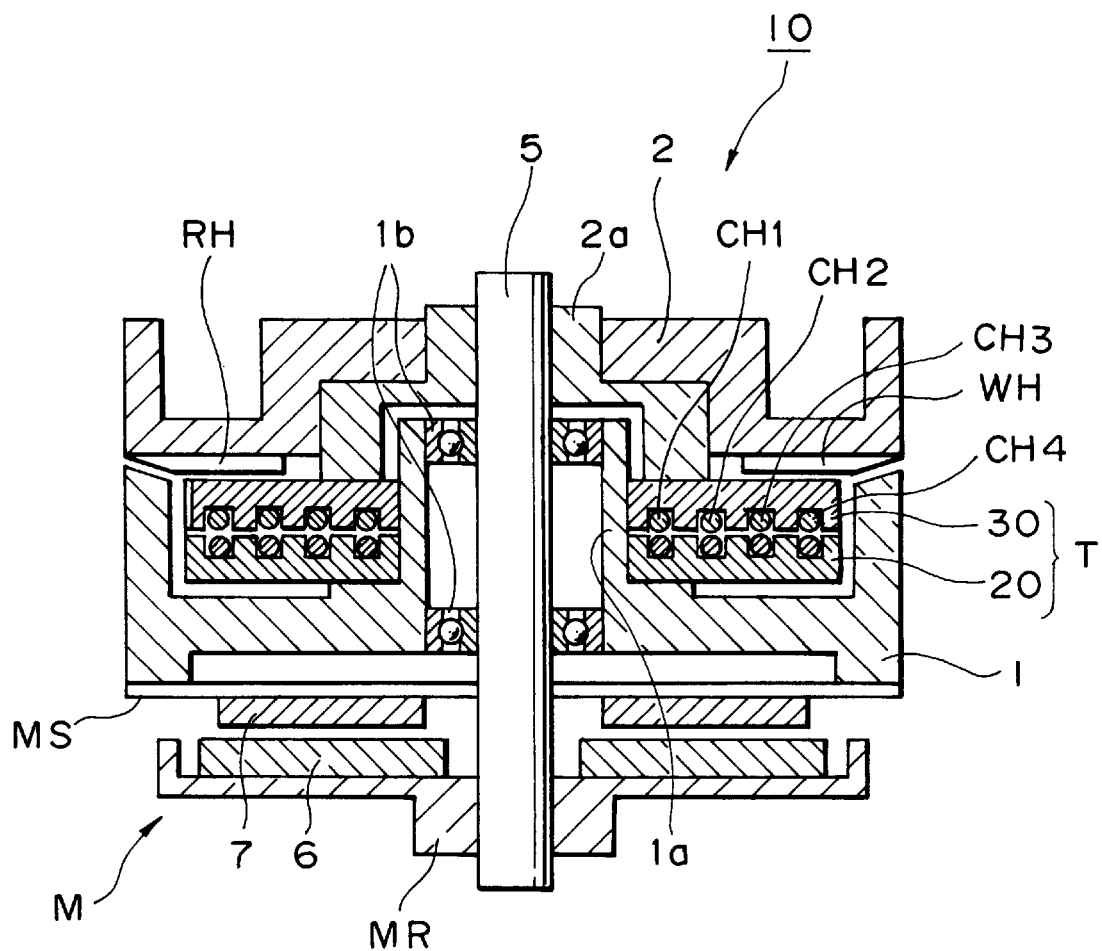
FIG. 3 is a diagram showing a structure for the rotary magnetic head unit shown in FIG. 1, in which a flat opposed type rotary transformer is incorporated.
Figure 4:
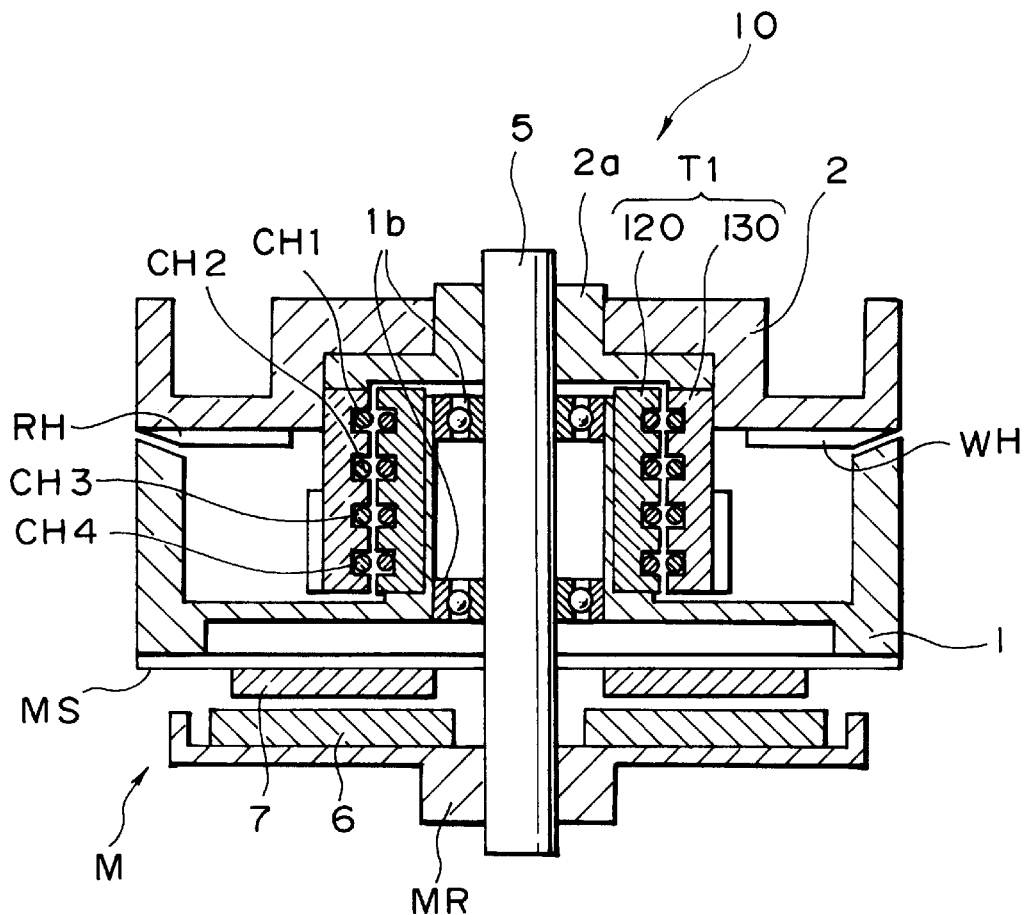
FIG. 4 is a diagram showing another structure for the rotary magnetic head unit shown in FIG. 1, in which a cylindrical rotary transformer is incorporated.

FIGS. 3 and 4 show examples of structures for the rotary magnetic head unit 10.

The rotary magnetic head unit 10 shown in FIG. 3 has a rotary transformer T, which is a non-contact type transmission device. The rotary transformer T is provided between the rotating drum 2 and the fixed drum 1. That is, the rotary transformer T is incorporated in the rotary magnetic head unit 10.

The rotary magnetic head unit 10 is also called a rotating drum unit. A pair of bearings 1b are provided in a sleeve 1a in the fixed drum 1. A stator core 20, which is a fixed member of the rotary transformer T, is fixed on the fixed drum 1.

The rotating drum 2 has a flange 2a, which is fixed to an upper end portion of a shaft 5 by being press-fitted or bonded thereto. A lower end of the shaft 5 is fixed to a rotor MR of the motor M. The motor M has the rotor MR and a stator MS. For example, a drive magnet 6 is provided on the rotor MR while a drive coil 7 is provided on the stator MS. By energizing the coil 7 in a predetermined pattern, the rotor MR of the motor M is continuously rotated.

An intermediate portion of the shaft 5 is rotatably supported on the pair of bearings 1b. A rotor core 30, which is a rotating member of the rotary transformer T is fixed inside the flange 2a.

Figure 5:
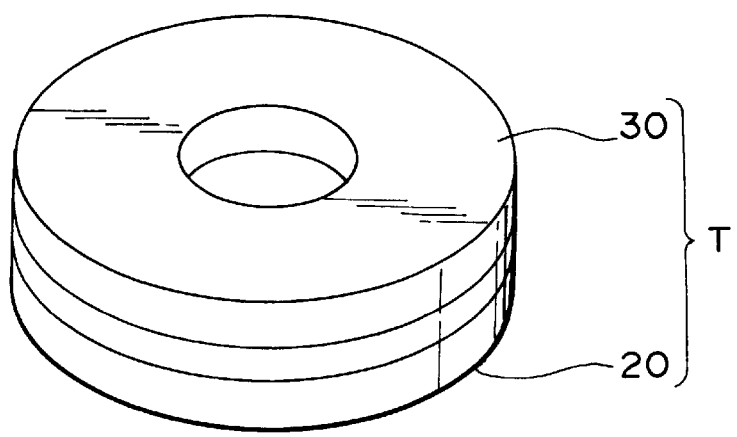
FIG. 5 is a perspective view of the rotary transformer shown in FIG. 3.

The rotary transformer T shown in FIG. 3 is formed of the stator core 20 (fixed member) and the rotor core 30 (rotating member), each of which is a disk-like core, such as that shown in FIG. 5, made of a magnetically permeable material, e.g., ferrite. Each of the stator core 20 and the rotor core 30 is formed into the shape of a ring such as to allow the sleeve 1a to pass through it, as shown in FIG. 3. In each of the inner surface (the upper surface as viewed in FIG. 3) of the stator core 20 and the inner surface (the lower surface as viewed in FIG. 3) of the rotor core 30, signal transmission channels CH1 to CH4 formed by wiring rings are provided concentrically about the central hole through which the shaft 5 passes, as described below.

As the wiring rings forming the channels CH1 to CH4, windings of an ordinary insulated wire or patterns on a printed circuit board may be used.

When the coil 7 of the stator MS of the motor M is energized in the thus-constructed rotary magnetic head unit 10, the rotor MR of the motor M, the shaft 5, the flange 2a, the rotating drum 2 and the rotor core 30 of the rotary transformer T rotate together relative to the fixed drum 1 and the stator core 20. The rotor core 30 and the stator core 20 are opposed to each other in a non-contact fashion.

Figure 6:
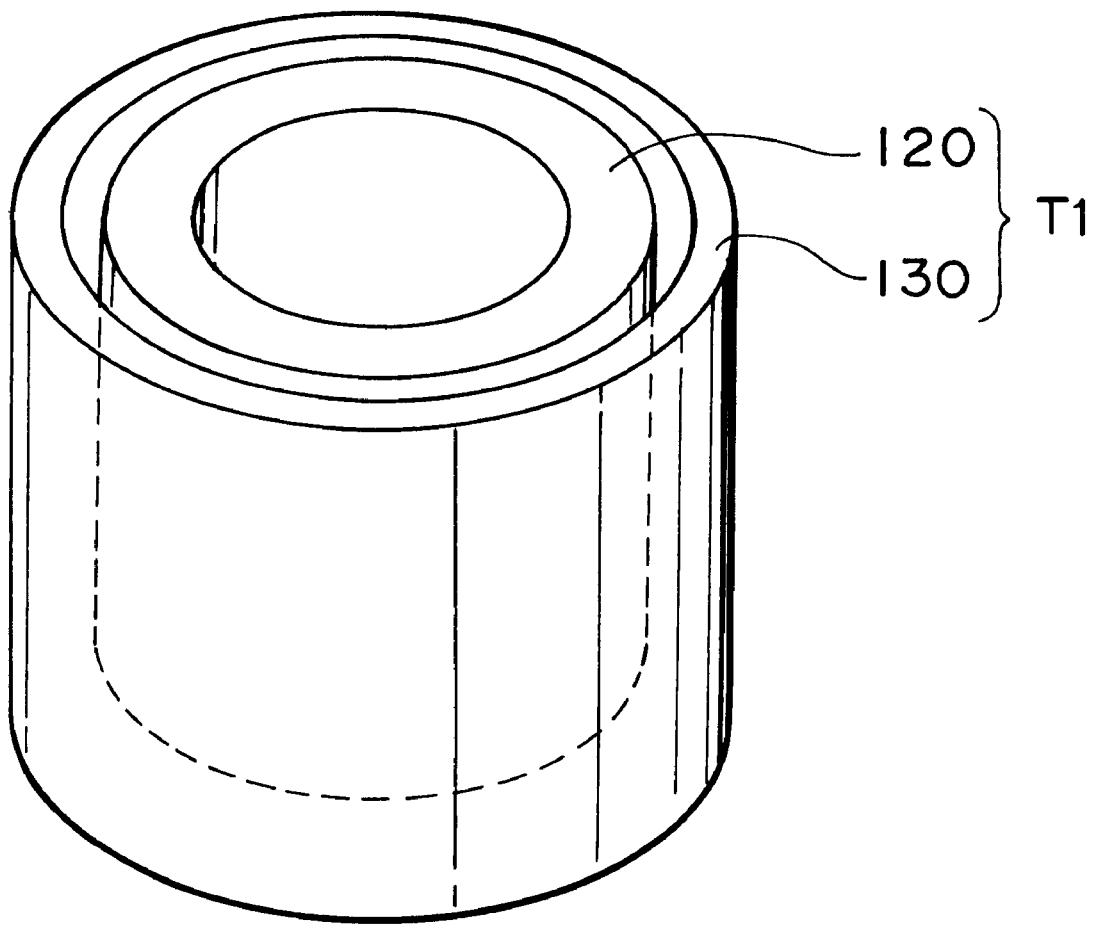
FIG. 6 is a perspective view of the rotary transformer shown in FIG. 4.

On the other hand, in the rotary magnetic head unit 10 shown in FIG. 4, a cylindrical stator core 120 of a rotary transformer T1, such as that shown in FIG. 6, is fixed on the fixed drum 1. A rotor core 130 of the rotary transformer T1 is fixed to the flange 2a of the rotating drum 2. The stator core 120 and the rotor core 130 are disposed coaxially about the shaft 5. The outside diameter of the stator core 120 is set so as to be smaller than the inside diameter of the rotor core 130. The outer surface of the stator core 120 and the inner surface of the rotor core 130 are thereby maintained in a non-contact relationship with each other with a predetermined gap formed therebetween. Channels CH1 to CH4 of the rotary magnetic head unit 10 shown in FIG. 4 are formed by wiring rings arranged in the axial direction.

When the coil 7 of the stator MS of the motor M is energized in a predetermined pattern, the rotor MR of the motor M, the shaft 5, the flange 2a and the rotor 130 of the rotary transformer T1 rotate together relative to the fixed drum 1 and the stator core 120 while being maintained in the non-contact relationship with the same by the predetermined gap.

The non-contact type transmission device of the present invention in an applied state may be either of the flat opposed type, represented by the rotary transformer T shown in FIG. 3, and the cylindrical type, represented by the rotary transformer T1 shown in FIG. 4.

An example of a wiring structure and peripheral components for the rotary transformer T shown in FIGS. 3 and 5 and will next be described with reference to FIGS. 7 and 8.

Figure 7:
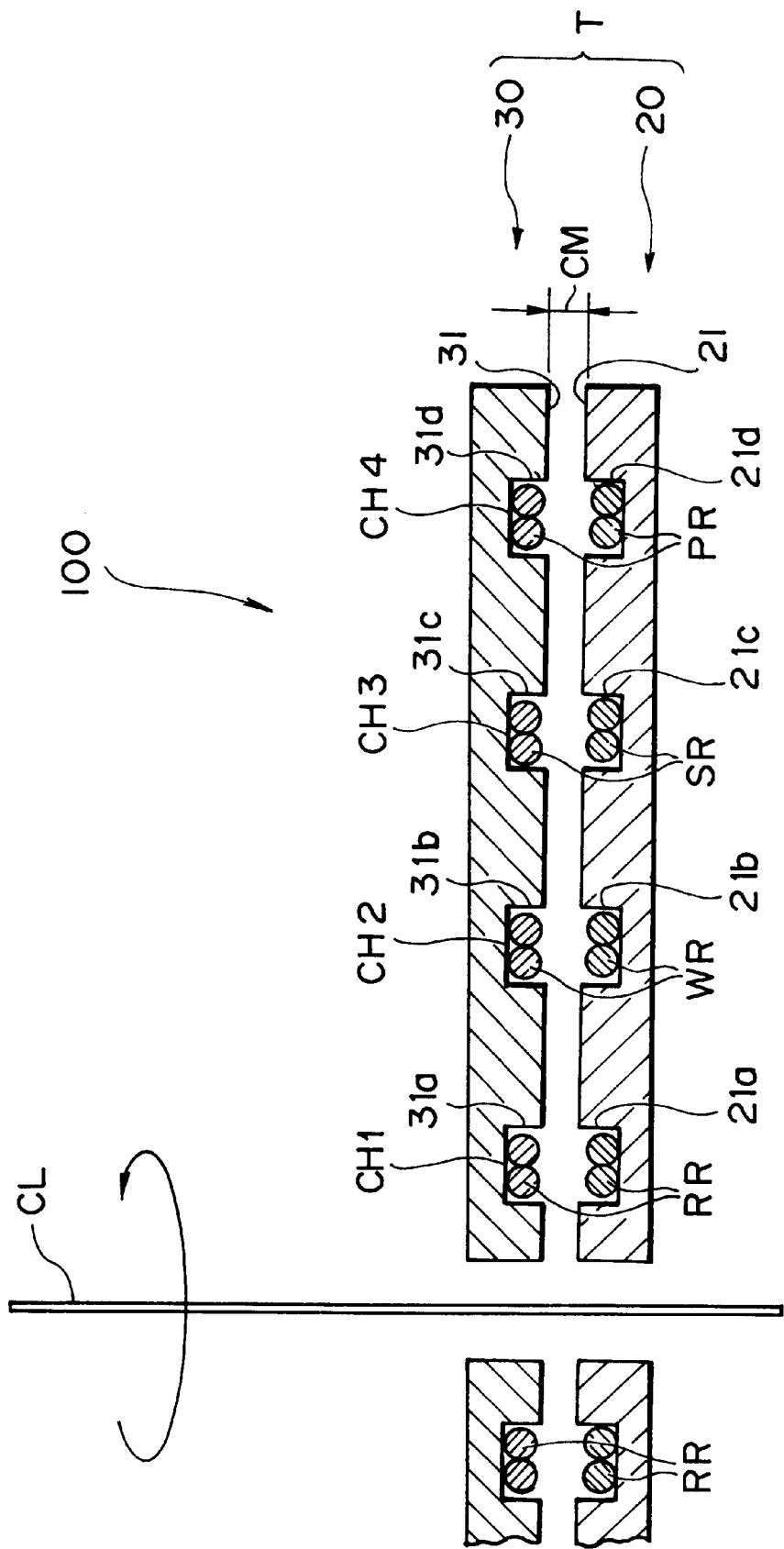
FIG. 7 is a cross-sectional view of a portion of a structure forming the rotary transformer shown in FIG. 5.

In FIG. 7, a cross section of the rotary transformer T is shown only partially since it is symmetrical about a line. The stator core 20 and the rotor core 30 are opposed to each other with a predetermined gap CM set therebetween.

Four grooves 21a, 21b, 21c, and 21d, for example, are formed concentrically about a center line CL in an inner surface 21 of the stator core 20 between inner and outer circumferential positions. Similarly, grooves 31a, 31b, 31c, and 31d are formed concentrically about the center line CL in an inner surface 31 of the rotor core 30. The group of grooves 21a to 21d and the group of grooves 31a to 31d are set in such positions as to face each other.

Reproduction signal transmitting rings RR are provided in the grooves 21a and 31a; recording signal transmitting rings WR in the grooves 21b and 31b; short-circuit rings SR in the grooves 21c and 31c; and power transmitting rings PR in the grooves 21d and 31d.

For example, each of the production signal transmitting rings RR, recording signal transmitting rings WR, short-circuit rings SR and power transmitting rings PR is formed in such a manner that a wire covered with an insulating material is wound a certain number of times to form the shape of a ring. Each of the rotor core 30 and the stator core 20 itself is made of a magnetically permeable material, e.g., ferrite and formed into the shape of a disk or a ring. The reproduction signal transmitting rings RR and the recording signal transmitting rings WR constitute signal transmission systems while the power transmitting rings PR constitute a power supply system.

Figure 8:
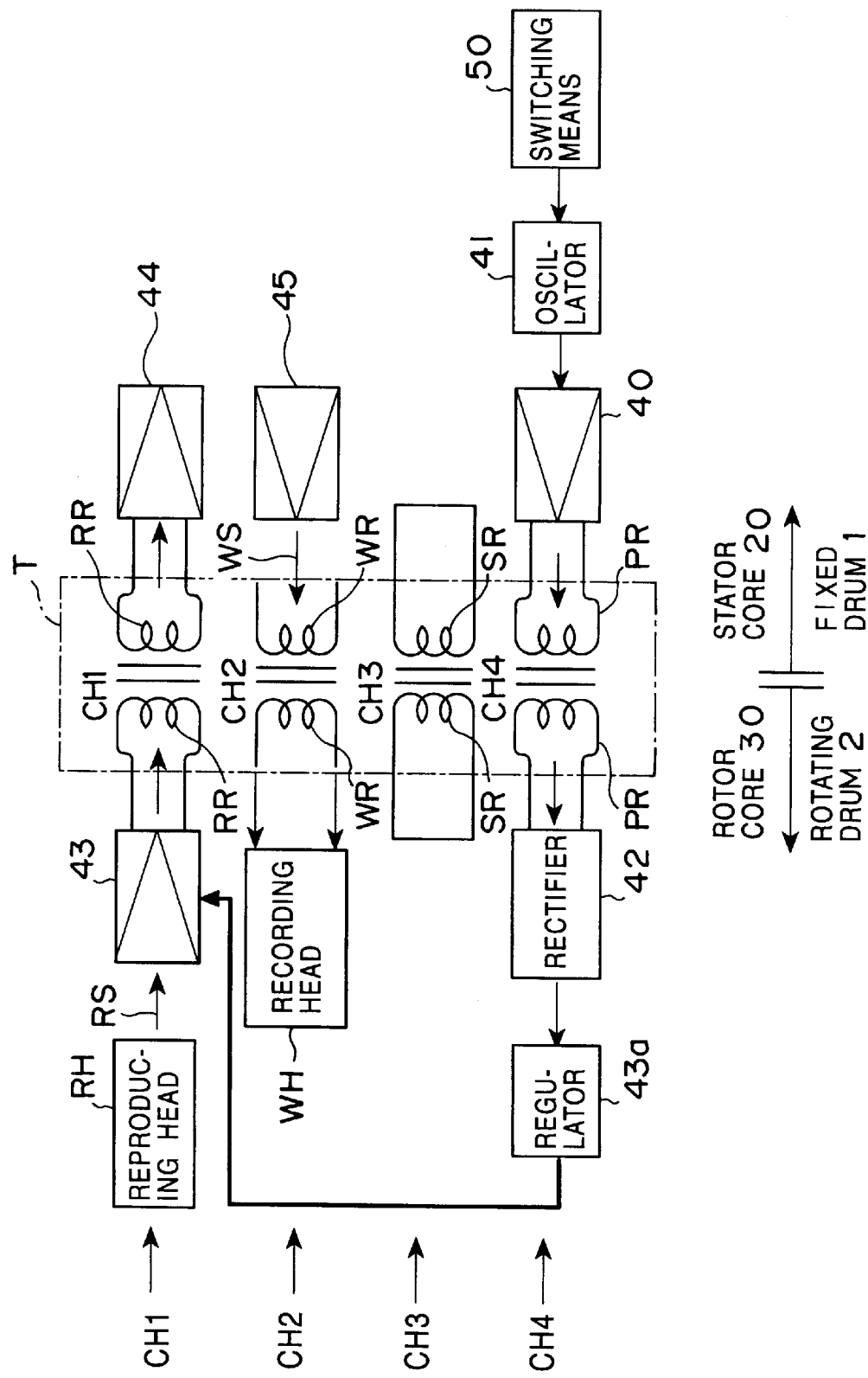
FIG. 8 is a diagram of the rotary transformer shown in FIG. 7 and related peripheral components.

FIG. 8 shows an arrangement of the rotary transformer T and peripheral functional sections which operate in association with the rotary transformer T.

The manner in which the rotary transformer T is illustrated in FIG. 8 is different from that in which the rotary transformer T is illustrated in FIG. 7; channels CH1 to CH4 are arranged in a vertical row in FIG. 8.

A feature of the rotary transformer T resides in that, as shown in FIGS. 7 and 8, two regions: a power supply region corresponding to the power transmitting rings PR; and a signal region corresponding to the reproduction signal transmitting rings RR and the recording signal transmitting rings WR, exist separately from each other, and that the region of the power transmitting rings PR and the region of the reproduction signal transmitting rings RR and the recording signal transmitting rings WR are separated from each other by a region corresponding to a crosstalk prevention section 100 formed by the short-circuit rings SR.

The crosstalk prevention section 100 formed by the short-circuit rings SR comprises a crosstalk prevention section in the rotor core 30 and a crosstalk prevention section in the stator core 20 for preventing crosstalk between the region of the power transmitting rings PR and the region of the reproduction signal transmitting rings RR and the recording signal transmitting rings WR.

Referring to FIG. 8, of the power transmitting rings PR forming the channel CH4, the power transmitting ring PR in the stator core 20 is connected to an oscillator 41 via a power drive 40. A dc current of a high frequency generated by the oscillator 41 is converted into an ac current, which is supplied to the power transmitting ring PR in the stator core 20 by the power drive 40. The power transmitting ring PR in the stator core 20 transmits the ac current to the power transmitting ring PR in the rotor core 30 in a non-contact manner. The transmitted ac current is rectified into a dc current by a rectifier 42. This dc current is set at a desired voltage by a regulator 43a.

Preferably, the current set at the voltage of the regulator 43a is supplied to a reproducing amplifier 43 connected to the reproducing head RH and is used for amplification of a reproduction current obtained by the reproducing head RH.

The reproducing head RH reproduces information on the magnetic tape TP shown in FIG. 1, and supplies a reproduction signal RS to the reproducing amplifier 43. The reproduction signal RS amplified by the reproducing amplifier 43 is supplied to the reproduction signal transmitting ring RR forming the channel CH1 in the rotor core 30. From the reproduction signal transmitting ring RR in the rotor core 30, the amplified reproduction signal RS is transmitted to the reproduction signal transmitting ring RR in the stator core 20 in a non-contact manner. On the stator core 20 side, the transmitted reproduction signal RS is further amplified by another reproducing amplifier 44.

A recording amplifier 45 provided on the fixed drum 1 side as shown in FIG. 8 supplies a recording current from a recording signal source to the recording signal transmitting ring WR forming the channel CH2 in the stator core 20. A recording signal WS is transmitted from the recording signal transmitting ring WR in the stator core 20 to the recording signal transmitting ring WR in the rotor core 30. This recording current is supplied directly to the recording head WH from the recording signal transmitting ring WR in the rotor core 30.

Since the recording head WH is connected directly to the recording signal transmitting ring WR in the rotor core 30 as described above, the impedance in a low-frequency range of the recording signal system formed of the recording head WH and the recording signal transmitting ring WR in the rotor core 30 can be reduced.

Each of the short-circuit rings SR arranged for the channel CH3 is a short-circuited coil or ring capable of reducing crosstalk between the recording system using the channel CH2 and the power transmission system using the channel CH4. The short-circuit rings SR forming the channel CH3 reduces crosstalk from the power transmission system using the channel CH4 to the recording signal system using the channel CH2. That is, the short-circuit rings SR respectively form short circuits in the stator core 20 and the rotor core 30 such as to reduce a signal leak (crosstalk) from the channel CH4 of larger power to the channel CH2 of smaller power by canceling a leakage magnetic field between the adjacent channels CH2 and CH4 in a well-known manner.

Switching means 50 shown in FIG. 8 performs on-off control of the operation of the oscillator 41. The switching means 50 turns on or off the oscillator 41 as shown in Table 9. The following is the reason for performing such on-off control of the oscillator 41.

The switching means 50 maintains the oscillator 41 in the off state when the recording head WH is in contact with the magnetic tape TP (at the time of signal recording). This is an operation in a mode A shown in FIG. 9. Also, the switching means 50 sets the oscillator 41 in the on state when the magnetic head H is not in contact with the magnetic tape TP (at the time of signal reproduction). This is an operation in a mode B shown in FIG. 9.

When the recording head WH is in contact with the magnetic tape TP, i.e., when the recording head WH is operated to record a signal on the magnetic tape TP, the reproducing head RH is not operated to reproduce any signal from the magnetic tape TP and there is no need to supply power from the oscillator 41 to the reproducing amplifier 43 shown in FIG. 8. In this situation, therefore, the oscillator 41 is maintained in the off state. On the other hand, when the recording head WH is not in contact with the magnetic tape TP, i.e., when the reproducing head RH is operated to reproduce a signal from the magnetic tape TP, the oscillator 41 is set in the on state to supply power from the regulator 43a to the reproducing amplifier 43, thereby enabling amplification of reproduction signal RS from the reproducing head RH.

Thus, in the mode A shown in FIG. 9, the oscillator 41 is maintained in the off state during recording with the recording head WH in contact with the magnetic tape TP, thereby reliably preventing crosstalk from the power system using the channel CH4 to the recording signal system using the channel CH2 shown in FIG. 8.

A method for preventing crosstalk from the power system using the channel CH4 to the recording signal system using the channel CH2 (the reproduction signal system using the channel CH1) may also be used in which conversion from dc current into ac current in the oscillator 41 and conversion from ac current into dc current by the rectifier 42 are such that a highest ac current frequency band does not overlap a frequency band for recording signals transmitted over the channel CH2.

Figure 10:
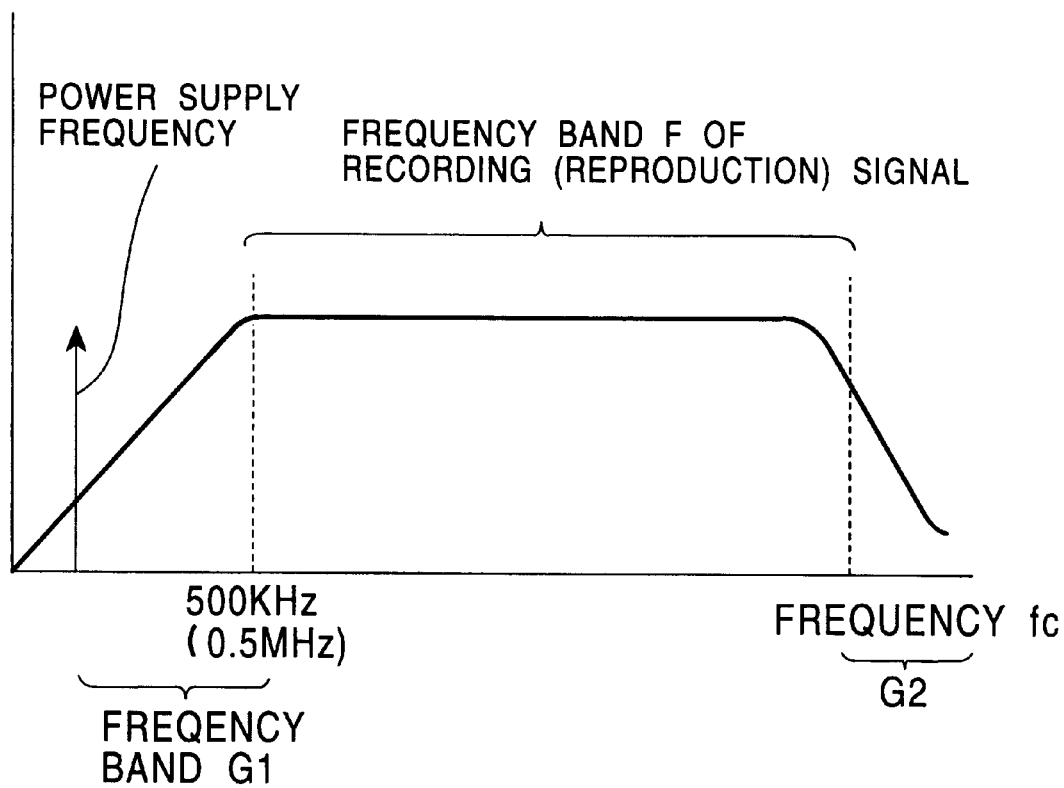
FIG. 10 is a diagram showing the relationship between a frequency band in the power system and a signal frequency band in a recording or reproduction system.

FIG. 10 shows an example of setting of a highest frequency band for ac current in the power system using the channel CH4 and a frequency band for recording signals in the recording signal system using the channel CH2 such that these frequency bands do not overlap each other. A signal frequency band F for the recording system is set so as to be different from a frequency band for high-frequency power supply ac current. In the example shown in FIG. 10, a frequency band Gi used for power is set such that the frequencies of harmonics of power current are lower than the frequency band F for signals in the recording system. A frequency band G2 for power can also be set at frequencies higher than the frequency band F for signals in the recording system. The frequency at the boundary between the frequency band G1 and the frequency band F is, for example, 500 kHz.

The frequency band F for signals in the reproducing system using the channel CH1 can also be set in the same relationship with frequency bands G1 and G2 as the frequency band F for signals in the recording system. Thus, crosstalk, i.e., a signal leak from the power stage using the channel CH4 to the recording system using the channel CH2 or the reproducing system using the channel CH1, can be reduced.

Figure 11:
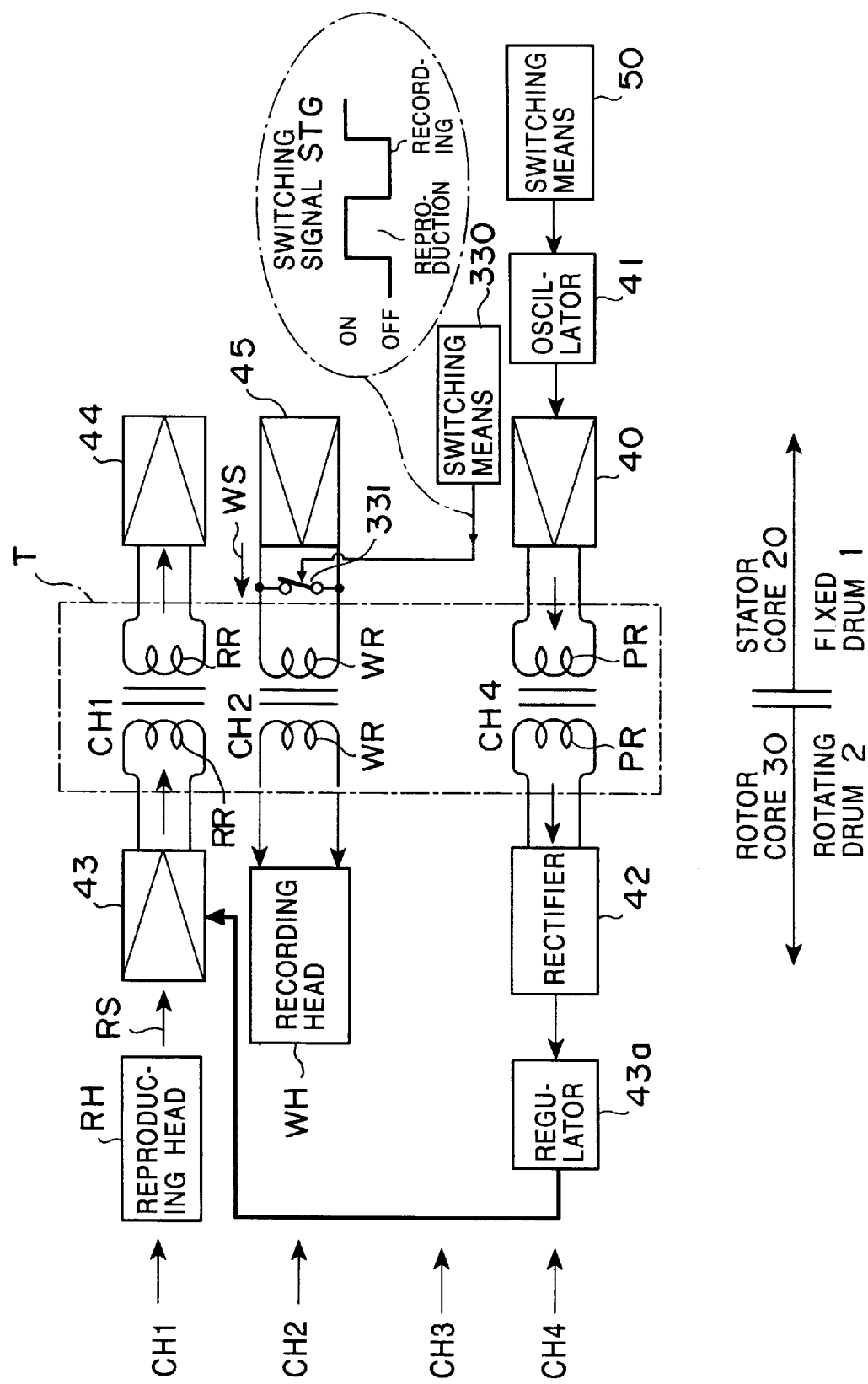
FIG. 11 is a diagram showing another arrangement different from that shown in FIG. 8.

FIG. 11 shows another arrangement of rotary transformer T and peripheral functional sections.

The rotary transformer T shown in FIG. 11 differs from that shown in FIG. 8 in that the channel CH3 short-circuit rings SR (the fixed member crosstalk prevention section and the rotating member crosstalk prevention section) are removed. Instead of the short-circuit rings SR, a switch 331 for short-circuiting the recording signal transmitting ring WR connected to the recording amplifier 45 is provided. The switch 331 can be turned on and off by a switching signal STG supplied from switching means 330.

When a signal on the magnetic tape TP is reproduced with the reproducing head RH, an on-switching signal STG is supplied from the switching means 330 to the switch 331. The switch 331 is thereby turned on to short-circuit the recording signal transmitting ring WR connected to the recording amplifier 45. In this manner, crosstalk from the power transmitting rings PR to the reproduction signal transmitting rings RR can be reduced.

Figure 12:
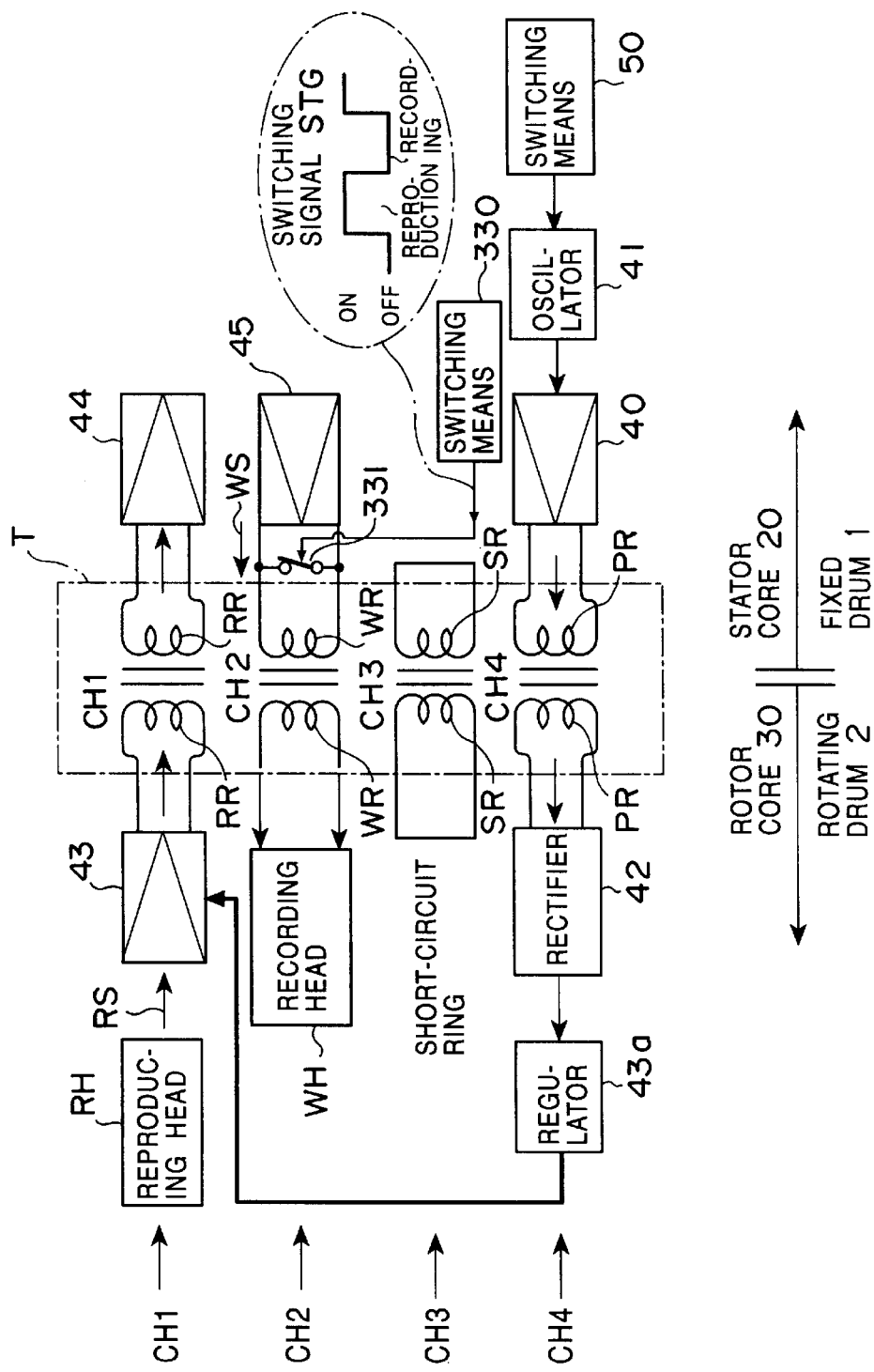
FIG. 12 is a diagram showing still another arrangement different from that shown in FIG. 8.

FIG. 12 shows still another arrangement of rotary transformer T and peripheral functional sections.

The rotary transformer T arrangement shown in FIG. 12 differs from that shown in FIG. 8 in that a switch 331 for short-circuiting the recording signal transmitting ring WR connected to the recording amplifier 45 is provided in addition to the channel CH3 short-circuit rings SR (the fixed member crosstalk prevention section and the rotating member crosstalk prevention section). The switch 331 can be turned on and off by a switching signal STG supplied from switching means 330.

When a signal on the magnetic tape TP is reproduced with the reproducing head RH, an on-switching signal STG is supplied from the switching means 330 to the switch 331. The switch 331 is thereby turned on to short-circuit the recording signal transmitting ring WR connected to the recording amplifier 45. In this manner, the effect of reducing crosstalk from the power transmitting rings PR to the reproduction signal transmitting rings RR can be improved. In the arrangement shown in FIG. 12, one channel CH3 is formed of short-circuit rings SR. However, the number of short-circuit ring channels can be increased.

Figure 13:
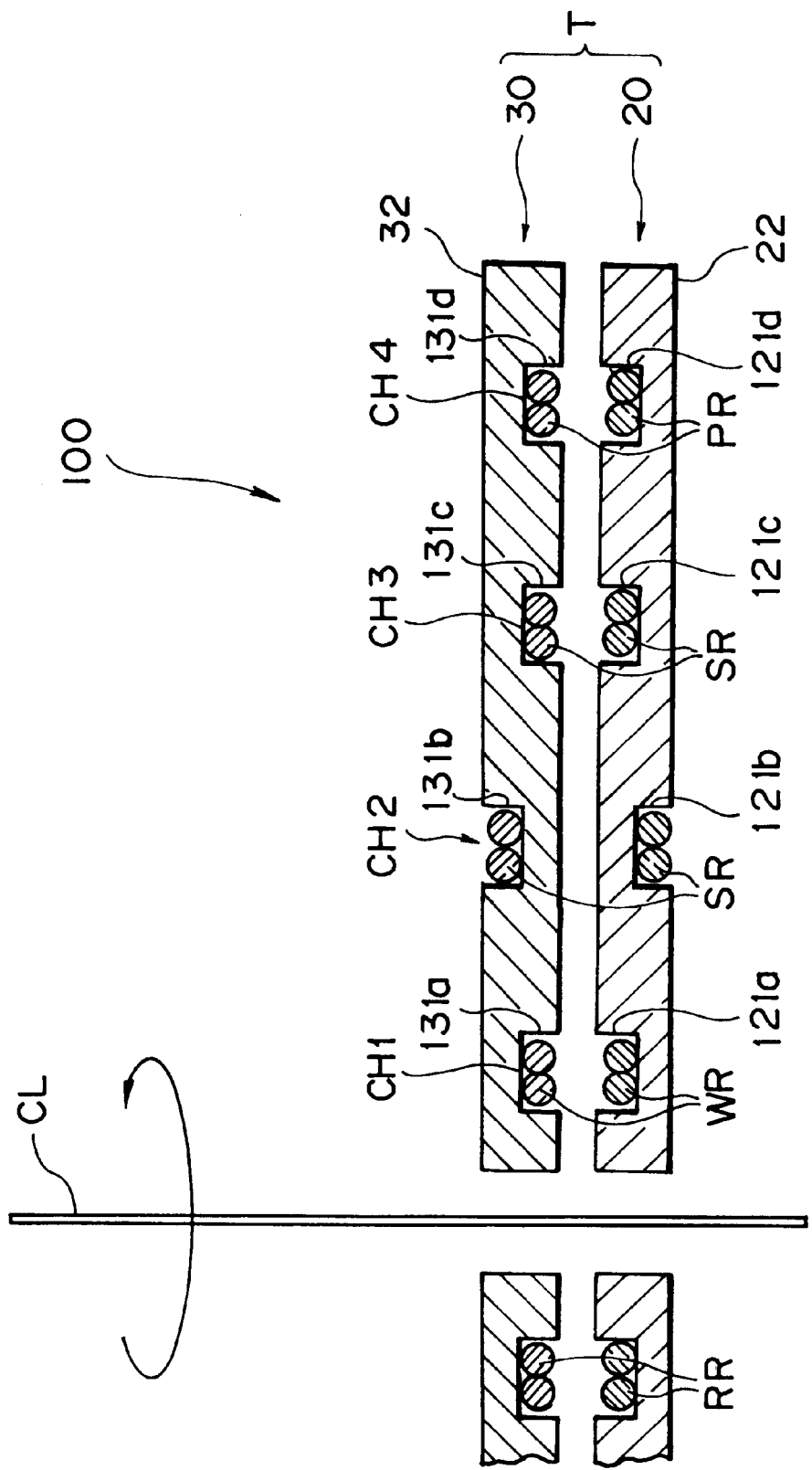
FIG. 13 is a diagram of a portion of another example of the flat opposed type rotary transformer.

FIG. 13 shows a further arrangement of rotary transformer T, in which only a groove 121b forming a crosstalk prevention section 100, among the grooves on the stator core 20 side, is formed in an outer surface 22 of the stator core 20. Similarly, only a groove 131b forming the crosstalk prevention section 100 is formed in an outer surface 32 of the rotor core 30. Thus, the grooves 121b and 131b are formed not in the inner surfaces but in the outer surfaces, and short-circuit rings SR are provided in the grooves 121b and 131b. This arrangement is also effective in preventing or reducing crosstalk.

Figure 14:
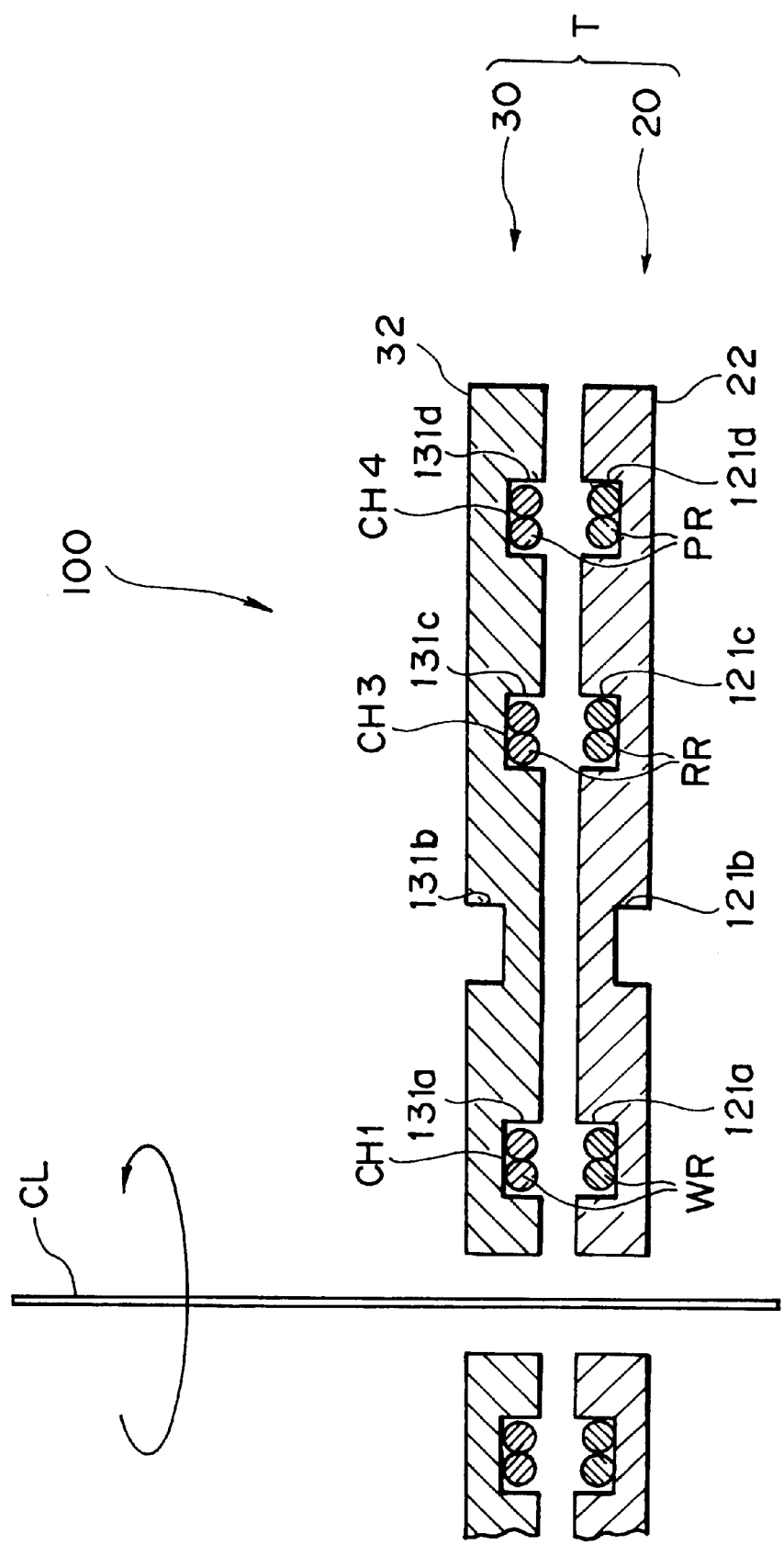
FIG. 14 is a diagram of a portion of still another example of the flat opposed type rotary transformer.

FIG. 14 shows a further arrangement of rotary transformer T, in which no short-circuit rings are provided in grooves 121b and 131b forming a crosstalk prevention section 100. Grooves 121b and 131b, even through they are provided alone, are effective in preventing or reducing crosstalk.

The concept of the crosstalk prevention section 100 shown in FIG. 13 or 14 can be put into practice in the same application as that of the arrangement shown in FIG. 7.

In the above-described embodiment, grooves for the crosstalk prevention section 100 may be formed in one or both of the inner and outer surfaces 21 and 22 of the stator core 20 and/or in one or both of the inner and outer surfaces 31 and 32 of the rotor core 30, and short-circuit ring SR may be formed or not formed in each groove.

A non-contact type transmission device which represents another embodiment of the present invention will next be described with reference to FIGS. 15 and 16.

Figure 15:
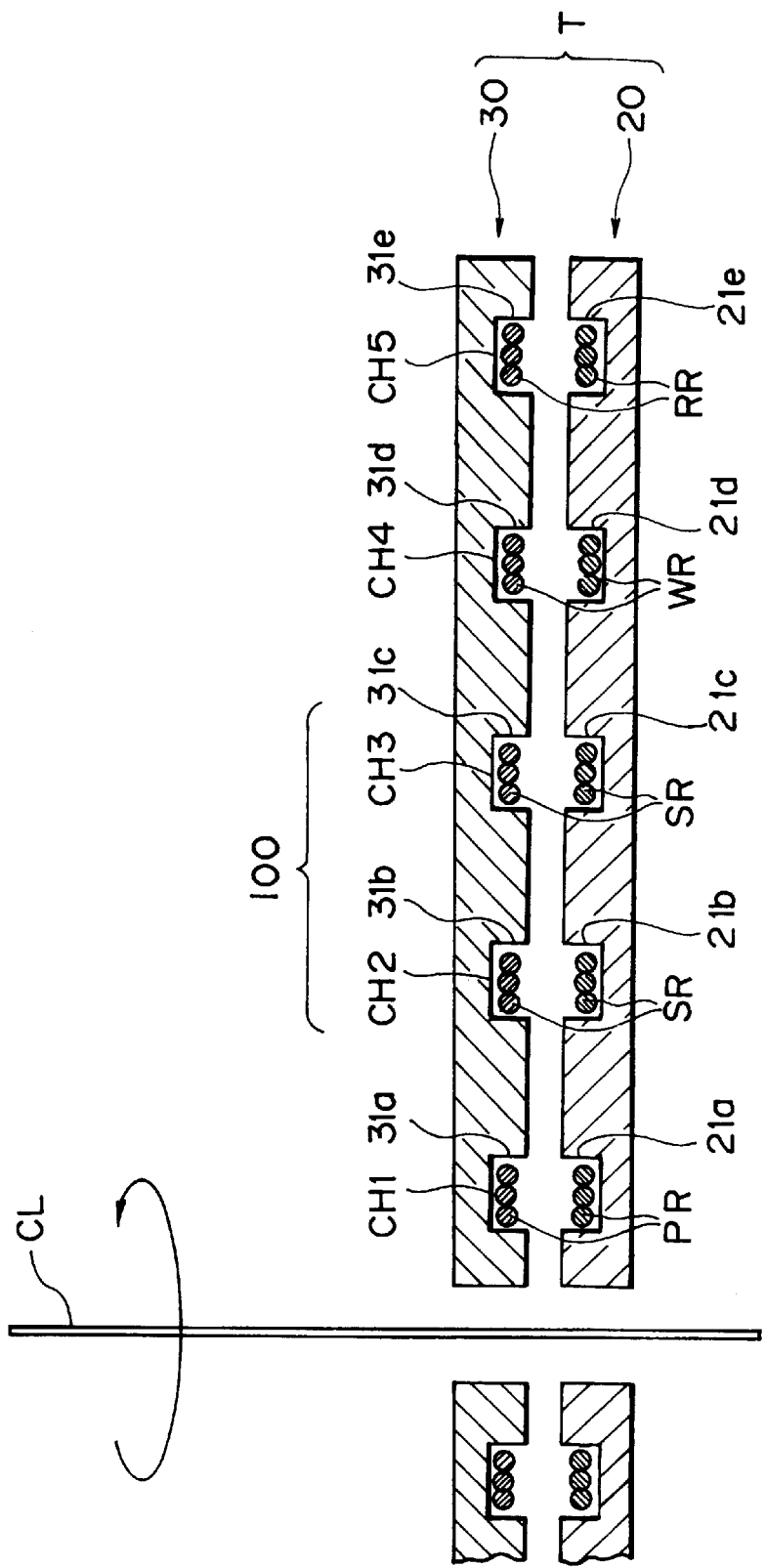
FIG. 15 is a diagram of a portion of a further example of the flat opposed type rotary transformer.

The rotary transformer T shown in FIG. 15 has channels CH1, CH2, CH3, CH4, and CH5, a total of five channels. Power transmitting rings PR are provided in grooves 21a and 31a for the channel CH1. Short-circuit rings SR are provided in grooves 21b and 31b for the channel CH2. Short-circuit rings SR are also provided in grooves 21c and 31c for the channel CH3. Recording signal transmitting rings WR are provided in grooves 21d and 31d for the channel CH4. Reproduction signal transmitting rings RR are provided in grooves 21e and 31e for the channel CH5.

Thus, the two pairs of short-circuit rings SR having different radii are provided between the power stage channel CH1 and the channel CH4 for the recording system. As described above, the region of a crosstalk prevention section 100 formed of a plurality of short-circuit rings is placed between the power system and the recording system to cancel a leakage magnetic field from the power system using the channel CH1 to the recording system using the channel CH4, thus reducing a signal leak, i.e., crosstalk, to the recording system.

Such an arrangement using short-circuit rings SR for a plurality of channels CH2, CH3 is preferred in a situation where the power of ac current in the power stage channel CH1 is so much larger than that of ordinary recording and reproduction signals that it is difficult to sufficiently reduce crosstalk of a signal from the power stage to the recording or reproducing system by one short-circuit ring.

To prevent crosstalk between the recording system using the channel CH4 and the reproducing system using the channel CH5 in the structure shown in FIG. 15, short-circuit rings for one channel may be provided between the channels CH4 and CH5.

Figure 16:
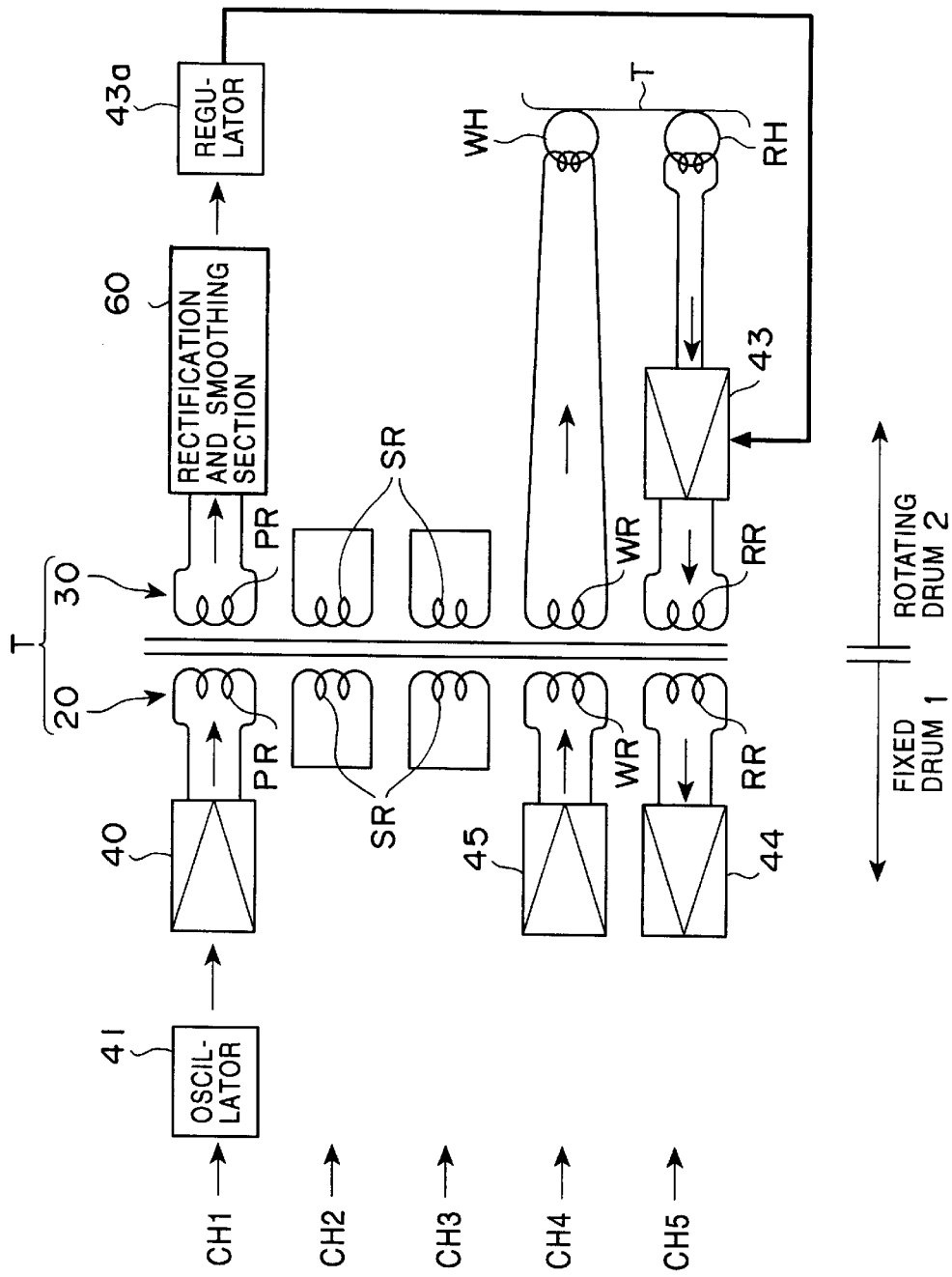
FIG. 16 is a diagram of the rotary transformer shown in FIG. 15 and related peripheral components.

FIG. 16 is a circuit diagram of the rotary transformer T described above with reference to FIG. 15 and an example of peripheral circuits connected to the rotary transformer T.

In the channel CH1, an oscillator 41 supplies an ac current to the power transmitting ring PR in the stator core 20 via a power drive 40. The ac current is transmitted from the power transmitting ring PR in the stator core 20 to the power transmitting ring PR in the rotor core 30 in a non-contact manner. A rectifying and smoothing section 60 on the rotating drum side converts the transmitted ac current into a dc current and supplies the dc current to a regulator 43a. The regulator 43a sets the dc current at a predetermined voltage and supplies the regulated power to a reproducing amplifier 43 connected to the reproducing head RH.

Each of the short-circuit rings SR for the channels CH2 and CH3 is a short-circuited coil.

A recording amplifier 45 is connected to the recording signal transmitting ring WR forming the channel CH4 in the stator core 20. A recording signal is transmitted from the recording signal transmitting ring WR in the stator core 20 to the recording signal transmitting ring WR in the rotor core 30 in a non-contact manner. Then, the recording signal transmitting ring WR in the rotor core 30, connected directly to the recording head WH, supplies the recording signal to the recording head WH. The recording head WH records the signal on a magnetic tape TP.

A reproduction signal which is reproduced from the magnetic tape TP by the reproducing head RH in association with the channel CH5 is amplified by the reproducing amplifier 43. For this amplification, the reproducing amplifier 43 is supplied with electric power from the regulator 43a. The reproduction signal is thereafter transmitted from the reproduction signal transmitting ring RR in the rotor core 30 to the reproduction signal transmitting ring RR in the stator core 20 in a non-contact manner and is amplified by a reproducing amplifier 44.

Needless to say, switching means 50 can also be connected to the oscillator 41 in the embodiment shown in FIGS. 15 and 16.

The channel assignment in the embodiment shown in FIGS. 15 and 16 may alternatively be such that, conversely to the assignment shown in FIG. 15, the outer channel CH5 is a power stage, the channels CH3 and CH4 are formed of short-circuit rings, the channel CH2 is used for the recording system and the channel CH1 is used for the reproducing system. Also, the positions of the recording and reproducing systems in the arrangement shown in FIG. 15 may be changed with each other.

In the arrangement shown in FIG. 15, crosstalk between the recording system using the channel CH4 and the reproducing system using the channel CH5 can be prevented by setting different periods for recording and reproducing, i.e., by maintaining the reproducing amplifier 44 on the fixed drum 1 side in the off state during recording and by maintaining the recording amplifier 45 in the off state during signal reproduction.

FIGS. 17 to 20 show still another embodiment of the present invention.

Figure 17:
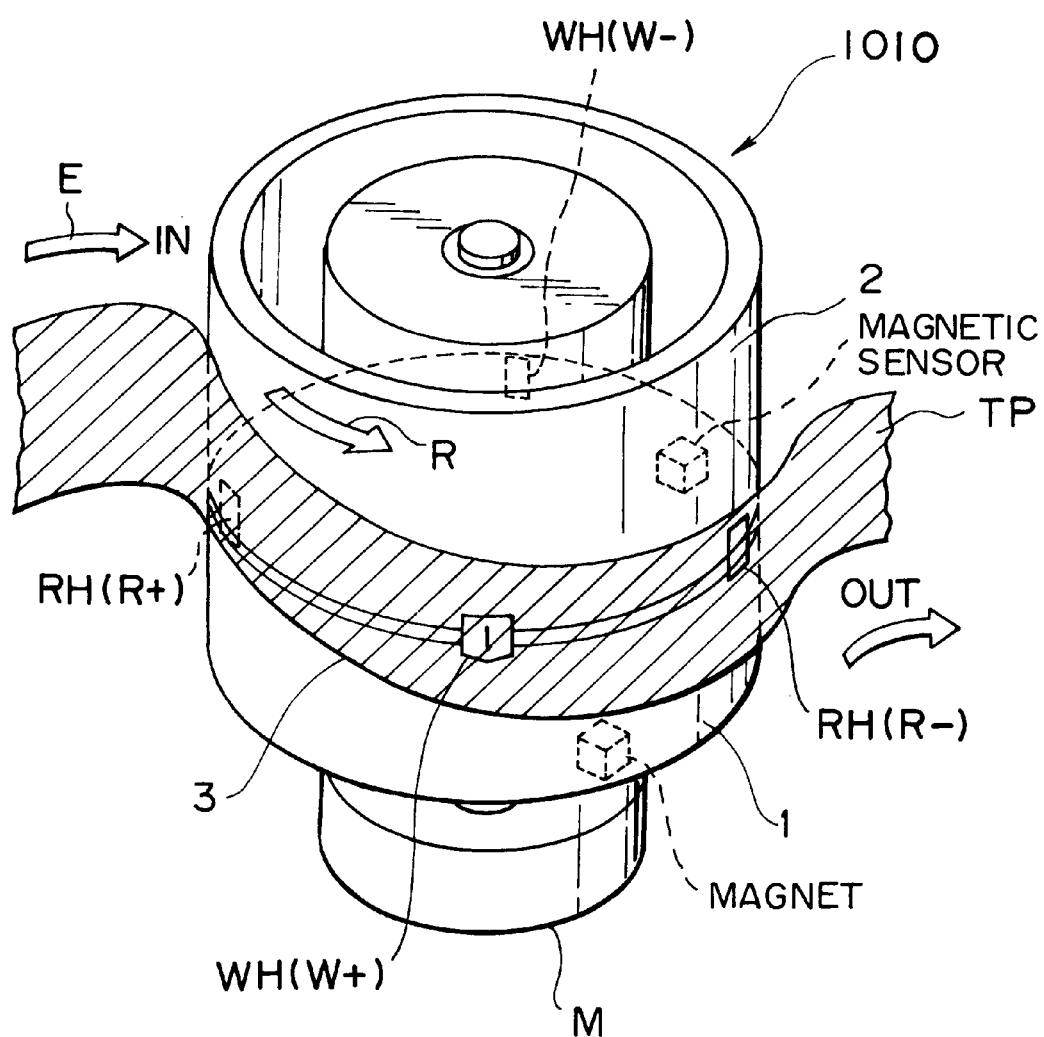
FIG. 17 is a perspective view of a rotary magnetic head unit which represents another embodiment of the present invention.
Figure 18:
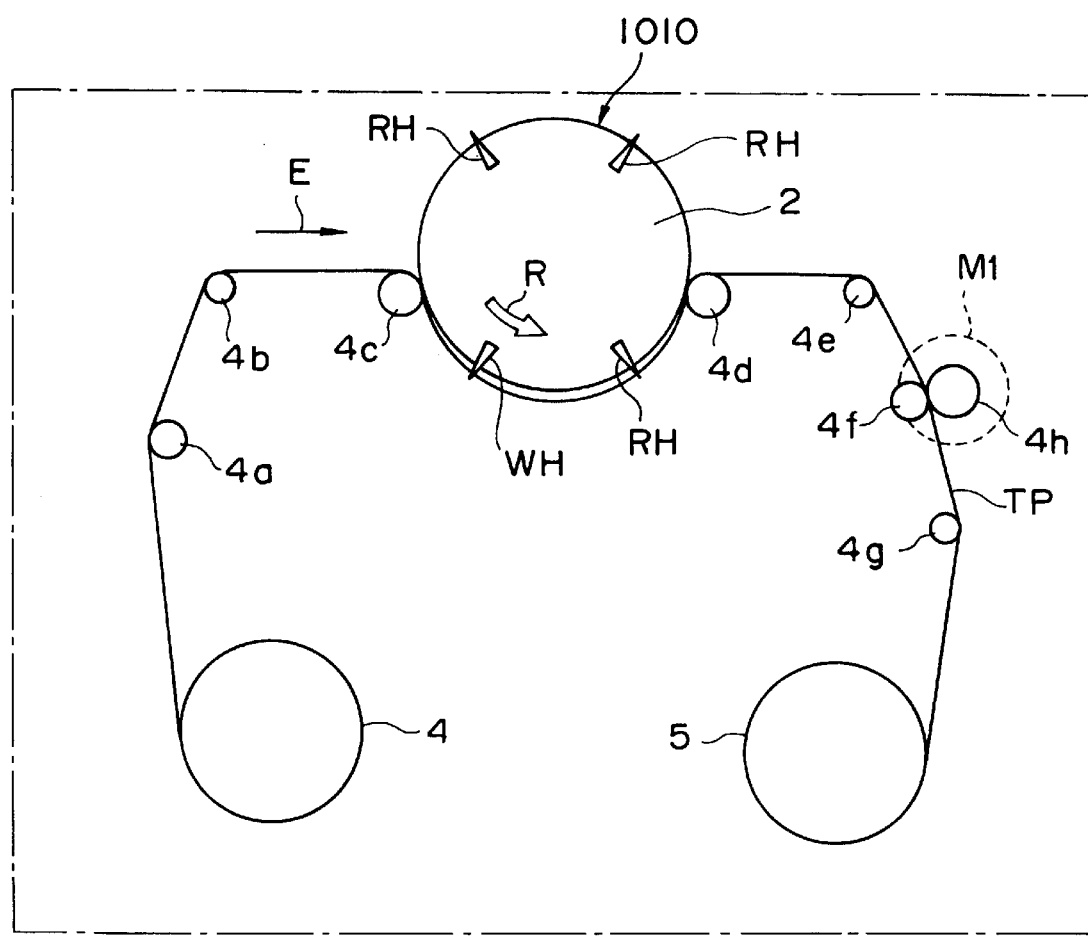
FIG. 18 is a schematic plan view of an information recording apparatus having the rotary magnetic head unit shown in FIG. 17.

A rotary magnetic head unit 1010 shown in FIG. 17 has two recording heads WH (W+) and WH (W−), and two reproducing heads RH (R+) and RH (R−) while the rotary magnetic head unit 10 shown in FIG. 1 use only one recording head WH and one reproducing head WH. The rotary magnetic head unit 1010 shown in FIG. 17 is applied to an information recording and reproducing apparatus as shown in FIG. 18. In other respects, the information recording and reproducing apparatus of this embodiment is the same as the information recording apparatus shown in FIG. 2. The same or identical components are designated with the same reference characters and the description of them will not be repeated.

The recording heads WH used in the rotary magnetic head unit 1010 shown in FIGS. 17 and 18 are disposed on the rotating drum 2 with a phase difference of 180°, as shown in FIG. 18. The reproducing heads RH are also disposed on the rotating drum 2 with a phase difference of 180°. Each recording head WH or reproducing head RH has a phase difference of 90° from the adjacent reproducing heads RH or recording heads WH.

Figure 19:
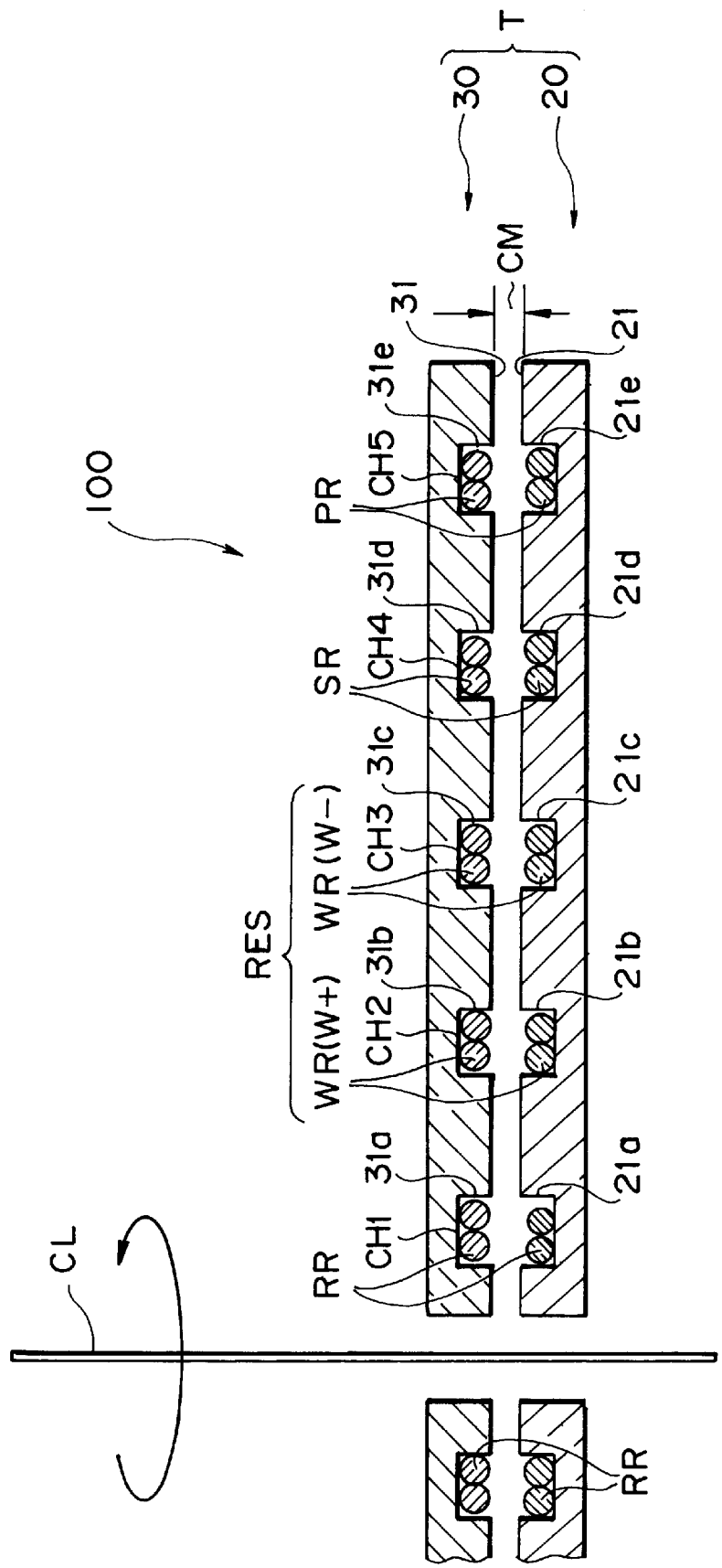
FIG. 19 is a diagram the rotary transformer incorporated in the unit shown in FIG. 17.
Figure 20:
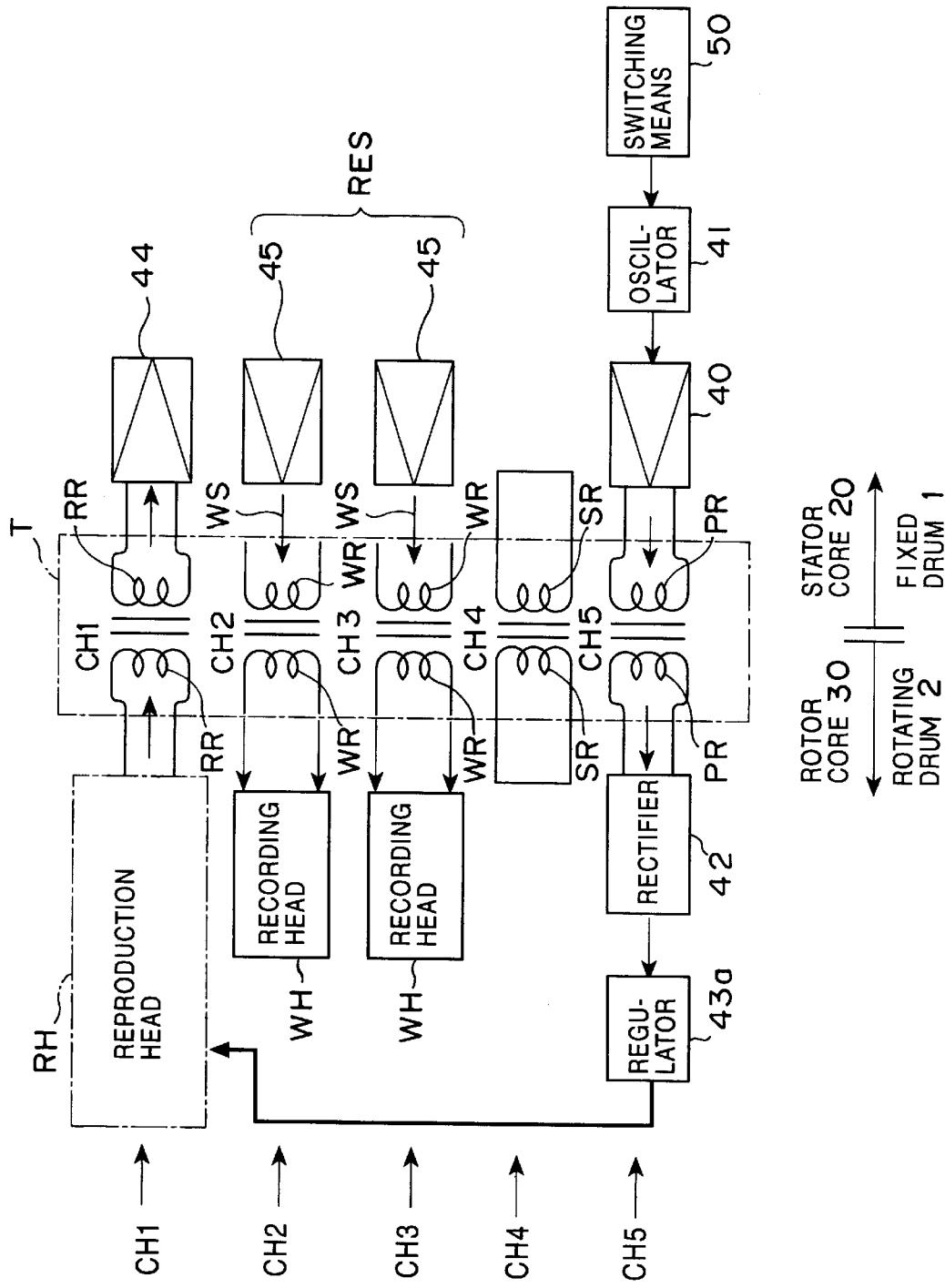
FIG. 20 is a diagram showing an arrangement using the rotary transformer shown in FIG. 19.

FIG. 19 is a diagram corresponding to FIG. 7. The rotary transformer T shown in FIG. 19 differs from the rotary transformer T shown in FIG. 7 in that two non-contact transmission systems are provided in association with the plurality of recording heads WH. Referring to FIGS. 19 and 20, the rotary transformer T has five channels CH1 to CH5. A recording system RES has two transmission systems. That is, as clearly seen in comparison with the embodiment shown in FIGS. 7 and 8, the embodiment shown in FIGS. 19 and 20 has two recording signal transmitting rings WR provided in the rotor core 30 and other two recording signal transmitting rings WR provided in the stator core 20 on the fixed drum 1 since the two recording heads WH are provided on the rotating drum 2 side. The recording signal transmitting rings WR in the stator core 20 are respectively connected to recording amplifiers 45, which supply recording signals WS to these recording signal transmitting rings WR. The recording signals WS can be transmitted from the recording signal transmitting rings WR in the stator core 20 to the recording signal transmitting rings WR in the rotor core 30 in a non-contact manner to be supplied to the recording heads WH.

As shown in FIGS. 19 and 20, the recording system RES having the two recording heads WH uses the channels CH2 and CH3, which are placed between the reproducing system channel CH1 and the other two channels, i.e., the channel CH4 having short-circuit rings SR and the power supply transmission system channel CH5. That is, the recording system RES has its transmission channels between the reproduction channel and the power channel. The recording system RES and the channel CH4 having short-circuit rings SR can serve to prevent crosstalk from the power system to the reproducing system through the power channel CH5 and the reproduction channel CH1 to a level low enough for practical use. That is, the recording system RES serves as a crosstalk prevention section as well as the channel CH4 having short-circuit rings SR. In each of the arrangements shown in FIGS. 20 and 21, there are two reproducing heads connected to the channel CH1. The two reproducing heads are changed over by switching to transmit a reproduction signal to the reproduction signal transmitting ring RR.

The magnetic gap of one of the recording heads WH has a plus azimuth angle (W+) while the magnetic gap of the other recording head WH has a minus azimuth angle (W−). If the time period through which one of these recording heads WH is in contact with the tape does not overlap with the time period through which the other recording head WH is in contact with the tape, crosstalk from the power channel CH4 to the reproduction channel CH1 can be reduced. If the information recording apparatus is arranged so that the time for contact of one of the recording heads WH with the tape is exclusive of the time for contact of the other recording head WH with the tape, i.e., if there is no need for a read-after-write (RAW) mode, crosstalk between the power channel CH4 and the reproduction channel CH1 can be reduced by interposing the recording channels CH2 and CH3 between the power channel CH4 and the reproduction channel CH1. The RAW mode is a mode in which information written on the magnetic tape is reproduced to be monitored immediately after writing.

As described above, in the embodiment shown in FIGS. 17 to 20, the rotating member signal wiring section (the recording signal transmitting rings WR in the rotor core 30) relating to recording signals of the recording heads WH is placed between the rotating member power supply wiring section (the power transmitting ring PR in the rotor core 30) and the rotating member signal wiring section (the reproduction signal transmitting ring RR in the rotor core 30) relating to reproduction signal of the reproducing heads (reproducing head unit) RH. Also, the fixed member signal wiring section (the recording signal transmitting rings WR in the stator core 20) relating to recording signals of recording heads WH is placed between the fixed member power supply wiring section (the power transmitting ring PR in the stator core 20) and the fixed member signal wiring section (the reproduction signal transmitting ring RR in the stator core 20) relating to reproduction signal of the reproducing head unit RH.

Thus, the recording signal transmitting rings WR in the rotor core 30 and the recording signal transmitting rings WR in the stator core 20 can serve to prevent crosstalk from the power channel CH5 to the reproduction channel CHI in cooperation with the short-circuit rings SR constituting the crosstalk prevention section 100.

Figure 21:
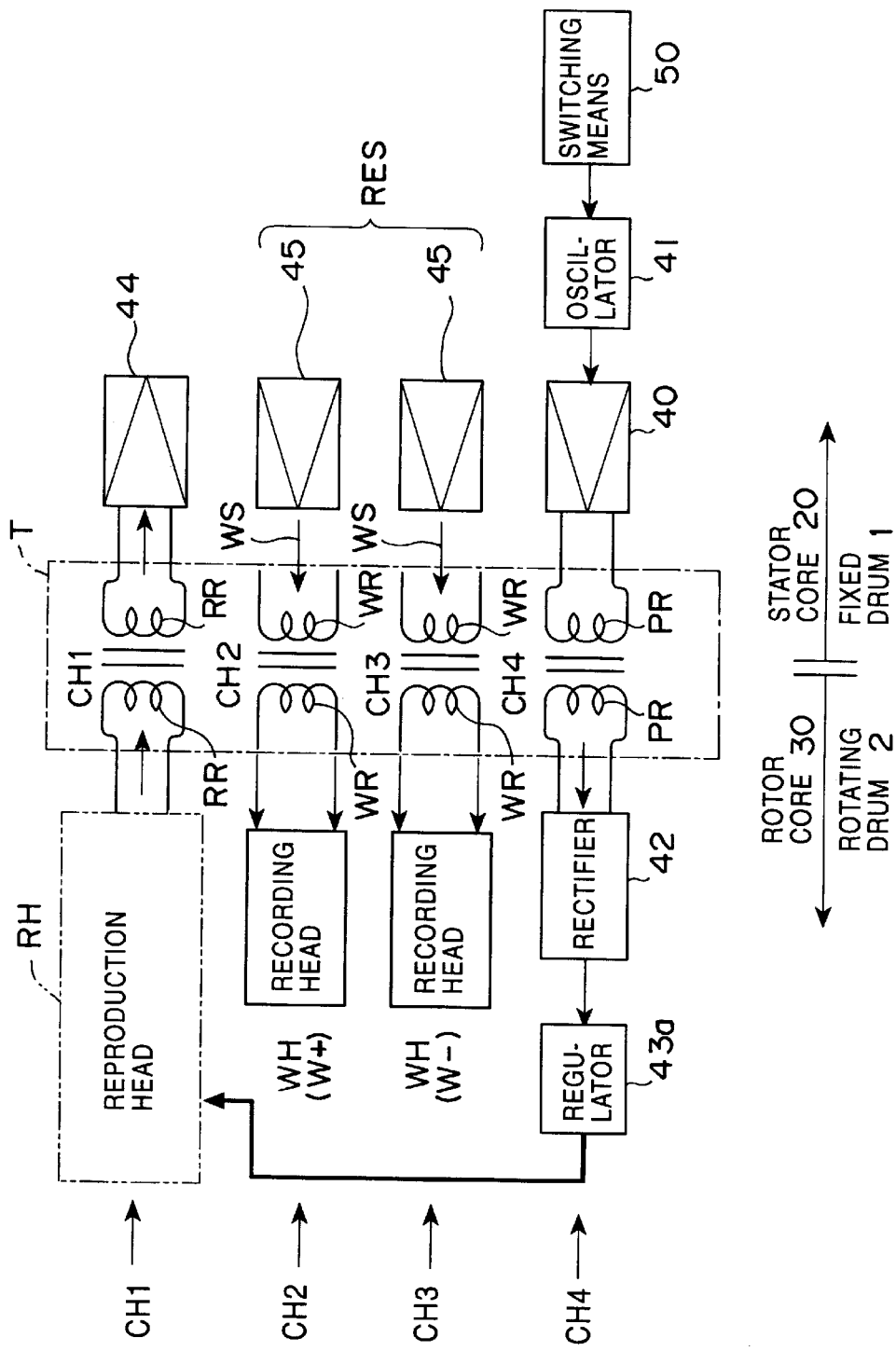
FIG. 21 is a diagram showing an arrangement using another rotary transformer.

FIG. 21 shows a further embodiment of the present invention. The embodiment shown in FIG. 21 differs from the embodiment shown in FIG. 20 in that the short-circuit rings SR shown in FIG. 20 are removed. In other respects, the embodiment shown in FIG. 21 is the same as the embodiment shown in FIG. 20. The identical or corresponding components are designated with the same reference characters and the description of them will not be repeated.

The recording system RES in this arrangement can also serve to prevent crosstalk from the power channel CH5 to the reproducing channel CH1 in the above-described manner.

The embodiments of the present invention have been described with respect to the flat opposed type rotary transformer shown in FIGS. 3 and 5. The concept of the above-described embodiments, however, can also be applied to the cylindrical rotary transformer Ti shown in FIGS. 4 and 6.

In each of the rotary transformers, i.e., the non-contact type transmission devices in accordance with the embodiments of the present invention, a signal region and a power region are provided and a crosstalk prevention section is provided between the signal and power regions, thereby enabling signals and power to be reliably transmitted in a non-contact manner. As a result, an initial stage reproducing amplifier can be provided in the drum of the rotary magnetic head unit to prevent a reduction in S/N.

At the time of reproduction, the recording signal transmitting rings WR (e.g., those on the stator core 20 side) shown in FIG. 20 or 21 may be short-circuited to serve as short-circuit rings.

In the above-described embodiments, since electric power is supplied from the power system to the reproducing amplifier 43 of the reproducing system, a magnetoresistive element head (MR head), for example, can be used as reproducing head RH. A reproducing MR head constantly requires a bias current when operated to obtain a reproduction signal. However, a bias current can be supplied from the regulator 43a to the reproducing amplifier 43 to enable the MR head to be operated to obtain a reproduction signal. The MR head is a head in which a change in resistance is caused by a change in magnetic field, and in which a change in signal magnetic field (input signal) is converted into a change in resistance to be extracted as a change in reproduction output signal (voltage).

The MR head is capable of obtaining a stable high-level reproduction output signal independent of the magnetic tape speed.

As described above, in the embodiments of the present invention, a region for transmitting power and a region for transmitting a signal are formed separately from each other in a common flat surface portion of the rotary transformer, and at least one channel for the recording system is provided between the power transmission region and the signal transmission region to prevent occurrence of a signal leak due to a leakage magnetic field, i.e., crosstalk, from the power transmission region to the signal transmission region.

In a different aspect, a region for transmitting power and a region for transmitting a signal are formed separately from each other in a common flat surface portion of the rotary transformer, and short-circuit rings for preventing crosstalk from the power transmission region to the signal transmission region are provided.

If two or more crosstalk prevention stages using short-circuit rings or the like are provided between the power transmission region and the signal transmission region, crosstalk from the power transmission region to the signal transmission region can be effectively reduced.

As described above, the transmission device and the rotary magnetic head unit having the transmission device according to the present invention are capable of performing reliable non-contact transmission in the signal system as well as reliable non-contact power supply transmission.

A further embodiment of the present invention in which a reproducing head formed of a magnetoresistive element is used and in which a bias current supplied to the reproducing head is controlled according to wear of the head will next be described with reference to FIGS. 22 to 26.

Figure 22:
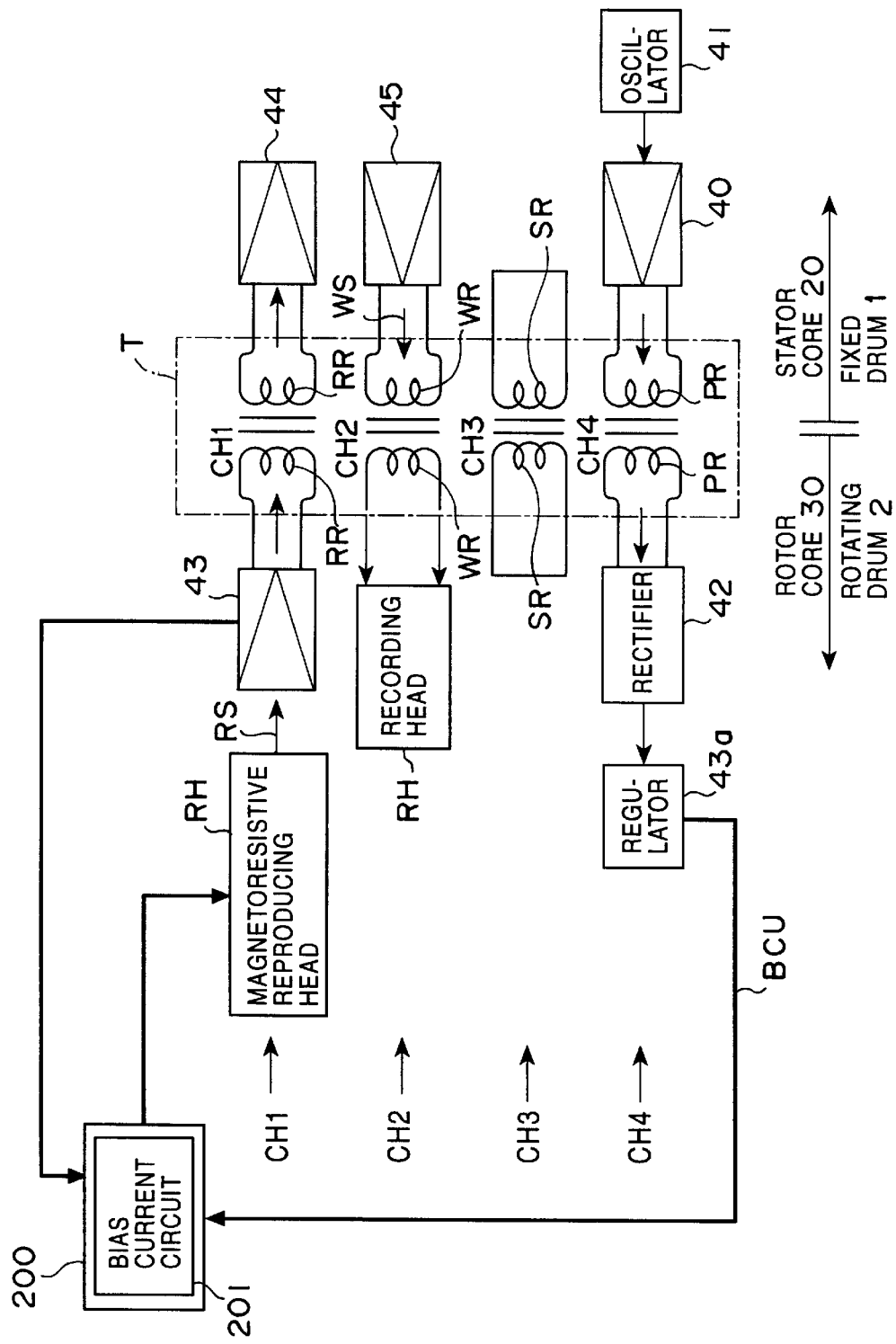
FIG. 22 is a diagram of the rotary transformer shown in FIG. 7 and related peripheral components.

FIG. 22 shows the rotary transformer T and peripheral functional sections which operate in association with the rotary transformer T.

The manner in which the rotary transformer T is illustrated in FIG. 22 is different from that in which the rotary transformer T is illustrated in FIG. 7; channels CH1 to CH4 are arranged in a vertical row in FIG. 22.

A feature of the rotary transformer T resides in that, as shown in FIGS. 7 and 22, two regions: a power supply region corresponding to the power transmitting rings PR; and a signal region corresponding to the reproduction signal transmitting rings RR and the recording signal transmitting rings WR, exist separately from each other.

Also, the region of the power transmitting rings PR and the region of the reproduction signal transmitting rings RR and the recording signal transmitting rings WR are separated from each other by a region corresponding to a crosstalk prevention section 100 formed by the short-circuit rings SR.

The crosstalk prevention section 100 formed by the short-circuit rings SR comprises a crosstalk prevention section in the rotor core 30 and a crosstalk prevention section in the stator core 20 for preventing crosstalk between the region of the power transmitting ring PR and the region of the reproduction signal transmitting rings RR and the recording signal transmitting rings WR.

Figure 23:
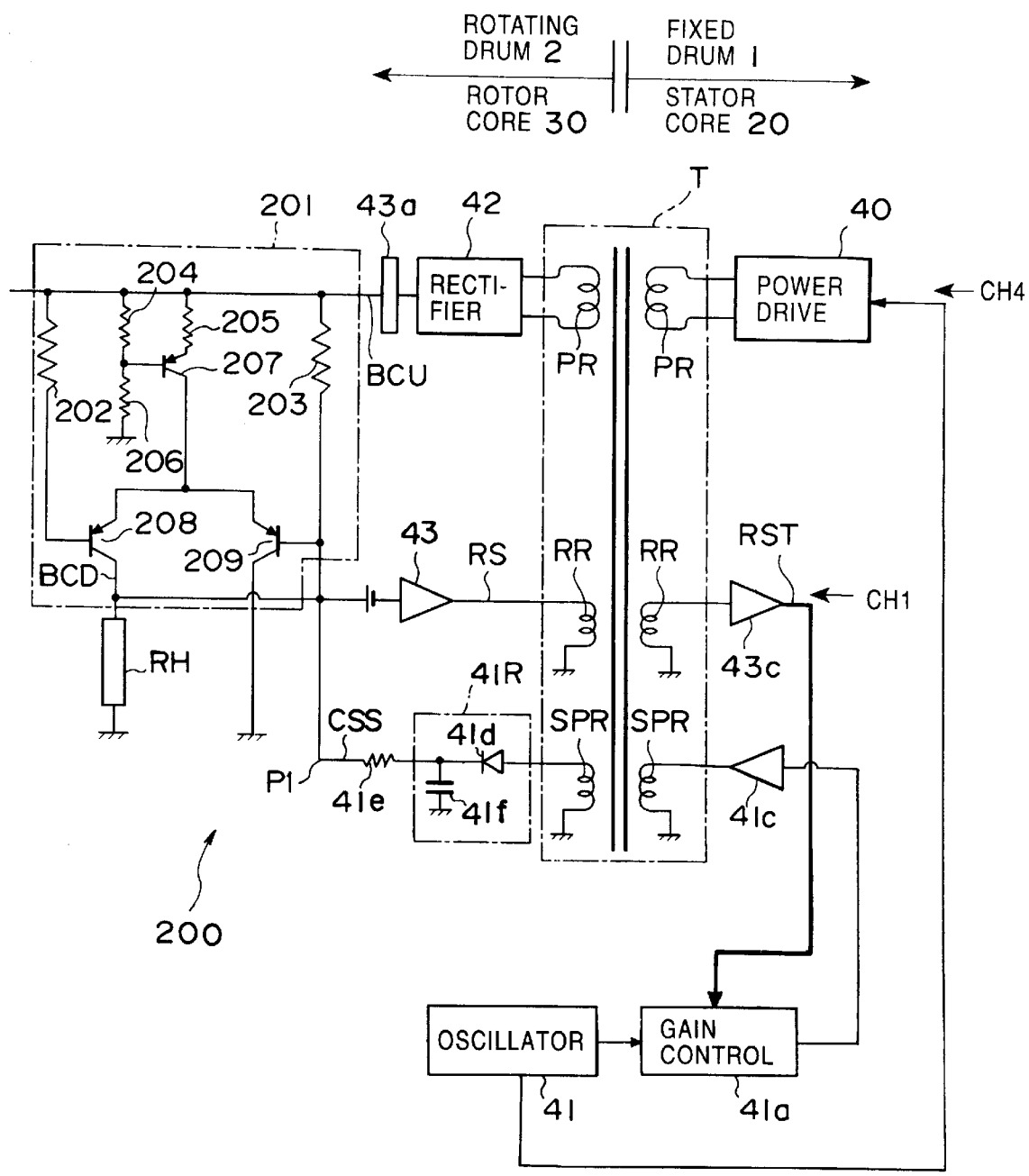
FIG. 23 is a diagram showing a preferred example of bias current control means for the rotary magnetic head unit of the present invention.

FIG. 23 shows details of the reproducing head RH formed of a magnetoresistive element and the peripheral sections.

Referring to FIGS. 22 and 23, of the power transmitting rings PR forming the channel CH4, the power transmitting ring PR in the stator core 20 is connected to an oscillator 41 via a power drive 40. A dc current of a high frequency generated by the oscillator 41 is converted into an ac current, which is supplied to the power transmitting ring PR in the stator core 20 by the power drive 40. The power transmitting ring PR in the stator core 20 transmits the ac current to the power transmitting ring PR in the rotor core 30 in a non-contact manner. The transmitted ac current is rectified into a dc current by a rectifier 42. This dc current is set at a desired voltage BCU by a regulator 43a.

The voltage BCU, output from the regulator 43a, is applied to bias current control means 200 for the reproducing head RH.

The reproducing head RH reproduces information on the magnetic tape TP shown in FIG. 1, and supplies a reproduction signal RS to a reproducing amplifier 43. The reproduction signal RS amplified by the reproducing amplifier 43 is supplied to the reproduction signal transmitting ring RR forming the channel CH1 in the rotor core 30. From the reproduction signal transmitting ring RR in the rotor core 30, the amplified reproduction signal RS is transmitted to the reproduction signal transmitting ring RR in the stator core 20 in a non-contact manner. On the stator core 20 side, the transmitted reproduction signal RS is further amplified by another reproducing amplifier 44. The reproducing amplifier 44 has an output RST of the reproduction signal RS.

In this embodiment, since electric power is supplied from the power system (channel CH4) to the reproducing system (channel CH1), a magnetoresistive element head (MR head) can be used as reproducing head RH.

The reproducing MR head requires a bias current when operated to obtain a reproduction signal. However, the MR head is a head in which a change in resistance is caused by a change in magnetic field. Therefore, it is capable of converting a change in signal magnetic field (input signal) into a change in resistance and extracting the change in resistance as a change in reproduction output signal (voltage).

A recording amplifier 45 provided on the fixed drum 1 side as shown in FIG. 22 supplies a recording current from a recording signal source to the recording signal transmitting ring WR forming the channel CH2 in the stator core 20. A recording signal WS is transmitted from the recording signal transmitting ring WR in the stator core 20 to the recording signal transmitting ring WR in the rotor core 30. From the recording signal transmitting ring WR in the rotor core 30, this recording current is supplied directly to the recording head WH.

Since the recording head WH is connected directly to the recording signal transmitting ring WR in the rotor core 30 as described above, the impedance in a low-frequency range of the recording signal system formed of the recording head WH and the recording signal transmitting ring WR in the rotor core 30 can be reduced.

Each of the short-circuit rings SR arranged for the channel CH3 is a short-circuited coil or ring capable of reducing crosstalk between the recording system using the channel CH2 and the power transmission system using the channel CH4. The short-circuit rings SR forming the channel CH3 reduces crosstalk from the power transmission system using the channel CH4 to the recording signal system using the channel CH2. That is, the short-circuit rings SR respectively form short circuits in the stator core 20 and the rotor core 30 such as to reduce a signal leak (crosstalk) from the channel CH4 of larger power to the channel CH2 of smaller power by canceling a leakage magnetic field between the adjacent channels CH2 and CH4 in a well-known manner.

The bias current control means 200 shown in FIG. 23 is provided in association with the rotary transformer T comprising the structure shown in FIGS. 7 and 22 to control the bias current supplied to the reproducing MR head RH.

While the rotary transformer T shown in FIGS. 7 and 22 has reproduction signal transmitting rings RR, recording signal transmitting rings WR, short-circuit rings SR and power transmitting rings PR, the rotary transformer T shown in FIG. 23 further has transmitting rings SPR for transmitting a reference signal. In FIG. 23, the reference transmitting rings SPR, the reproduction signal transmitting rings RR and the power transmitting rings PR are shown representatively.

The bias current control means 200 has a function of detecting the output RST of reproduction signal RS from the reproducing amplifier 43 connected to the reproducing MR head RH and controlling the value of bias current BCD to the reproducing head RH so that the output RST of reproduction signal RS is maximized.

A bias current circuit 201 of the bias current control means 200 is a circuit for supplying the bias current to the reproducing MR head RH is operated to reproduce a signal from magnetic tape TP.

The bias current circuit 201 has resistors 202 to 206 and transistors 207 to 209. The power drive 40 transmits a power supply from the power transmitting ring PR in the stator core 20 to the power transmitting ring PR in the rotor core 30. The ac current of the transmitted power supply is converted into a dc current by being rectified by the rectifier 42. The voltage BCU obtained by rectification is supplied to the bias current circuit 201 to enable the bias current circuit 201 to supply the bias current BCD to the reproducing head RH.

A reproduction signal RS obtained from the reproducing MR head RH is amplified by the reproducing amplifier 43 at a point P2 and is transmitted from the reproduction signal transmitting ring RR in the rotor core 30 to the reproduction signal transmitting ring RR in the stator core 20. The transmitted reproduction signal is further amplified by a reproducing amplifier 43c and is supplied to a gain control 41a.

The gain control 41a adjusts the width of sine wave generated by the oscillator 41. The adjusted sine wave is amplified by an amplifier 41c and is supplied to the reference transmitting ring SPR in the stator core 20. This sine wave is transmitted from the reference transmitting ring SPR in the stator core 20 to the reference transmitting ring SPR in the rotor core 30, and is supplied as a control signal CSS to the bias current circuit 201 via a diode 41d of a rectification circuit 41R and a resistor 41e. The rectification circuit 41R has the diode 41d and a capacitor 41f.

In the thus-arranged peripheral circuits, if the bias current of the reproducing MR head RH is changed due to wear of the head, the value of the output RST of reproduction signal RS obtained from the reproducing amplifiers 43 and 43c is changed. According to the change in the output RST of reproduction signal RS, the gain control 41a controls the gain of the sine wave of the oscillator 41 and supplies the control signal CSS to the bias current circuit 201 at a point P1, thereby changing the voltage BCU for the reproducing MR head RH. The output RST of reproduction signal RS can be maximized (optimized) thereby.

Figure 24A:
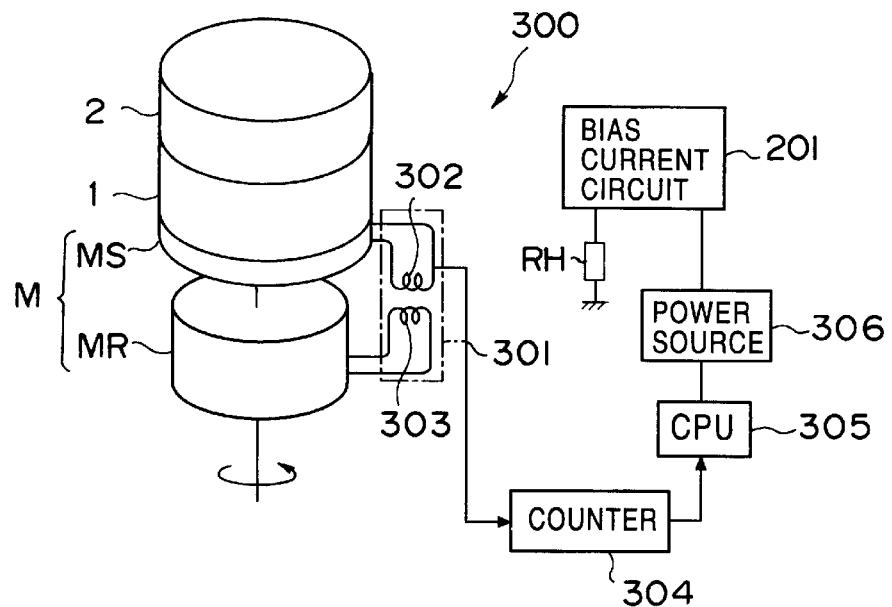
FIGS. 24A, 24B, and 24C are diagrams of another preferred example of bias current control means for the rotary magnetic head unit of the present invention.
Figure 24B:
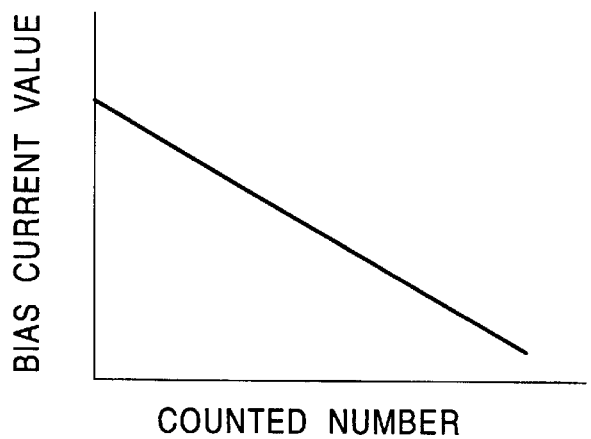
Figure 24C:
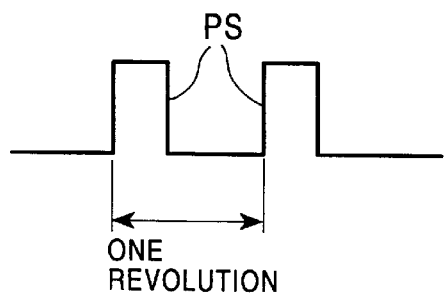

FIGS. 24A, 24B, and 24C show bias current control means 300 different from the bias current control means 200 shown in FIG. 23.

This bias current control means 300 is a system in which the number of revolutions (cumulative revolutions) of the motor M shown in FIGS. 1 and 24A is detected and the bias current supplied to the reproducing head RH is previously determined according to the number of revolutions.

As shown in FIG. 24A, a pulse generator 301 is arranged in association with the motor. The pulse generator (PG) 301 has coils 303 and 302 respectively disposed on the rotor MR and the stator MS of the motor M shown in FIG. 3, thereby enabling a counter 304 to count the number of revolutions (cumulative revolutions) of the rotor MR relative to the stator MS.

As shown in FIG. 24C, each time the motor MR makes one revolution, one pulse PS is generated. The counter 304 count pulses PS generated in this manner and informs a central processing unit (CPU) 305 of the number of pulses PS counted. The CPU 305 sends an instruction to a power source 306 based on the count value of the counter 304.

The power source 306 is thereby made to supply a control voltage according to the number of revolutions to the bias current circuit 201. The reproducing MR head RH reproduces a signal from the magnetic tape on the basis of the bias current from the bias current circuit 201, thereby maximizing (optimizing) the reproduction signal output.

FIG. 24B shows an example of the relationship between the bias current value and the number counted by the counter 304. As the counted number increases, the bias current value can be reduced at a rate inversely proportional to the rate at which the counted number increases.

If the number of revolutions of the rotor MR of the motor M, i.e., revolutions of the rotating drum 2, is detected and if the current value according to the detected number of revolutions is previously determined as described above, the bias current supplied from the bias current circuit 201 to the reproducing MR head RH can be controlled so that the reproduction signal output from the reproducing head RH is maintained at the maximum level while the amount of wear of the reproducing head RH increases.

Figure 25:
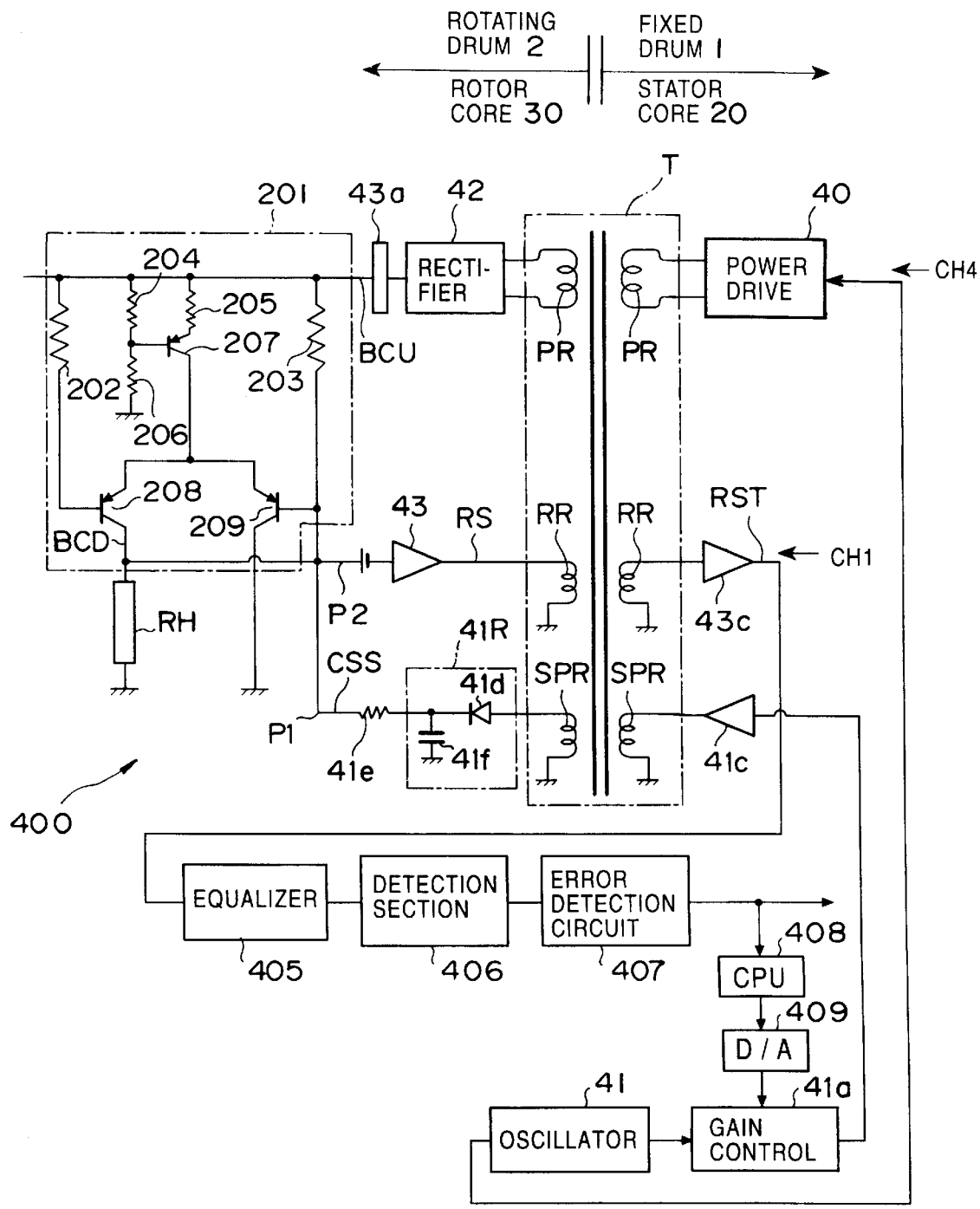
FIG. 25 is a diagram of still another preferred example of bias current control means for the rotary magnetic head unit of the present invention.

FIG. 25 shows still another bias current control means 400.

The bias current control means 400 shown in FIG. 25 differs from the bias current control means 200 shown in FIG. 23 in that an equalizer 405, a detection section 406, an error detection circuit 407, a CPU 408, a digital-to-analog converter circuit (D/A) 409 are provided between the reproducing amplifier 43c and the gain control 41a. The other components of the bias current control means 400 shown in FIG. 25 are arranged in the same manner as the corresponding components of the bias current control means 200 shown in FIG. 23.

In the arrangement shown in FIG. 25, the reproducing MR head RH with the bias current circuit 201 reads a reproduction signal from magnetic tape TP. The bias current circuit 201 is arranged so that the bias current value BCD can be changed by the control signal CSS at the point P1. The reproduction signal RS from the point P2 is supplied through the reproducing amplifier 43 to the outside of the fixed drum 1 by being transmitted through the reproduction transmitting rings RR. The bias current circuit 201 is supplied with voltage BCU from the power transmitting rings PR via the rectifier 42.

The output RST of reproduction signal RS obtained via the reproducing amplifier 43c is set at a predetermined voltage by the equalizer 405 and is detected in the detection section 406. The detected output RST of reproduction signal RS is compared with a predetermined output level in the error detection circuit 407 to detect an error in the output RST. That is, an error rate, e.g., the rate at which the output RST of reproduction signal RS becomes lower than the predetermined output level is measured and sent to the CPU 408. The CPU 408 determines a change in the gain of the sine wave from the oscillator 41 and makes the gain control 41a cause this change.

The signal for this operation, output from the CPU 408, is converted into an analog signal by the digital-to-analog converter 409, and this analog signal is supplied to the gain control 41a. The sine wave of the oscillator 41 controlled by the gain control 41a is transmitted by the reference transmitting rings SPR and supplied to the diode 41d of the rectification circuit 41R, thereby forming control signal CSS. This control signal CSS is supplied to the voltage BCU of the bias current circuit 201, thereby enabling the bias current circuit 201 to change the bias current value for the reproducing head RH.

Figure 26A:
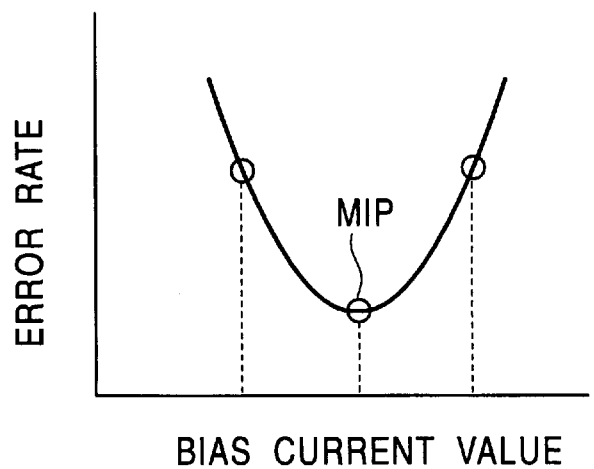
FIGS. 26A, 26B, and 26C are diagrams showing the relationship between the error rate and the bias current with respect to the example shown in FIG. 25.
Figure 26B:
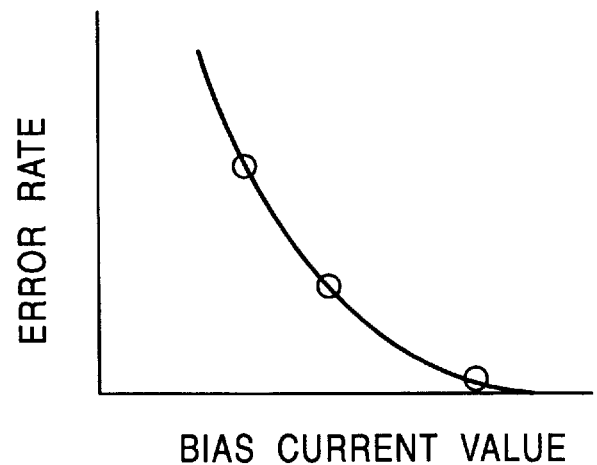
Figure 26C:
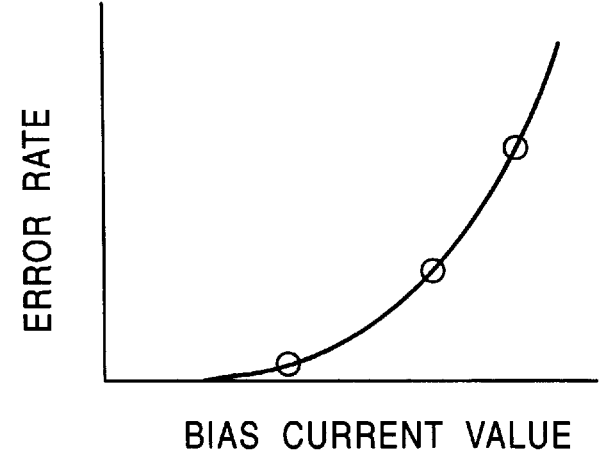

FIG. 26A shows an example of the relationship between the value of bias current supplied to the reproducing head RH and the error rate detected by the error detection circuit 407. The bias current value is set according to the amount of wear of the reproducing head RH so as to correspond to a point MIP at which the error rate becomes minimum. This setting is performed in such a manner that the bias current value is alternately changed in the increasing and decreasing directions as shown in FIGS. 26B and 26C, and is further changed in one of the increasing and decreasing directions so that the error rate becomes minimum, as shown in FIG. 26B or 26C, thus selecting the optimal bias current value corresponding to the amount of wear of the reproducing head RH.

The above-described embodiment of the present invention is an example of use of the flat opposed type rotary transformer shown in FIGS. 3 and 5. However, needless to say, the concept of the above-described embodiments can also be applied to the cylindrical rotary transformer T1 shown in FIGS. 4 and 6.

The power transmitting rings PR, the reproduction signal transmitting rings RR and the reference transmitting rings SPR shown in FIG. 23 or 25 may be provided in separate rotary transformers.

The rotary magnetic head unit of the above-described embodiment of the present invention has been made by noticing that use of a reproducing head formed of a magnetoresistive element greatly contributes to the improvement in recording density, and by arranging the bias current circuit to supply the reproducing MR head with a bias current corrected according to the amount of wear of the head, thus making it possible to maintain the reproduction output from the reproducing MR head at a high level.

As described above, if a reproducing head formed of a magnetoresistive element is used, the head bias current is changed according to wear of the head so as to optimize the output of the reproduction signal obtained by the reproducing head.

What is claimed is:

1. A non-contact transmission device in a signal recording and reproduction device for transmitting a power supply and at least a recording signal between a rotating member and a fixed member in a non-contact manner, said transmission device comprising:

a rotating member having a rotating member power supply wiring section and a rotating member signal wiring section;

a fixed member having a fixed member power supply wiring section for transmitting supply power and a fixed member signal wiring section, said fixed member signal wiring section comprising at least a subsection for transmitting a recording signal; and means for short-circuiting, at the time of signal reproduction, the at least a subsection of said fixed member signal wiring section for transmission of a recording signal;

wherein, when supply power is transmitted between said rotating member power supply section and said fixed member power supply section, recording signals are not transmitted between said fixed member signal wiring section and said rotating member signal wiring section during reproduction; and when supply power is not being transmitted between said rotating member power supply section and said fixed member power supply section, signals are transmitted between said fixed member signal wiring section and said rotating member signal wiring section.

2. A non-contact type transmission device according to claim 1, wherein said fixed member signal wiring section further comprises a subsection for transmitting a reproduction signal, and wherein the recording signal transmitting subsection is short-circuited at the time of reproduction to function as a crosstalk prevention section for preventing crosstalk from said fixed member power supply section to the reproduction signal transmitting section.

3. A non-contact type transmission device according to claim 1, wherein said rotating member and said fixed member are one of a set of disk-like members opposed to each other and a set of cylindrical members differing in size and coaxial with each other.

4. A non-contact type transmission device according to claim 1, wherein a plurality of rotating member crosstalk prevention sections are provided in said rotating member while a plurality of fixed member crosstalk prevention sections are provided in said fixed member.

5. A rotary magnetic head unit for recording a signal on an information recording medium in the form of a tape and for reproducing a signal from the information recording medium, said rotary magnetic head unit comprising:

a transmission device having a rotating member and a fixed member, said transmission device transmitting a power supply and a signal between the rotating member and the fixed member in a non-contact manner;

a rotating drum on which the rotating member of said transmission device is supported;

a fixed drum on which the fixed member of said transmission device is supported, the rotating member of said transmission device having a rotating member power supply wiring section for transmitting a power supply, a rotating member signal wiring section for transmitting a signal, and at least one rotating member crosstalk prevention section for preventing crosstalk between the rotating member power supply wiring section and the rotating member signal wiring section, the rotating member crosstalk prevention section being positioned between the rotating member power supply wiring section and the rotating member signal wiring section.

the fixed member of said transmission device having a fixed member power supply wiring section for transmitting a power supply between itself and the rotating member power supply wiring section, a fixed member signal wiring section for transmitting a signal between itself and the rotating member signal wiring section, and at least one fixed member crosstalk prevention section for preventing crosstalk between the fixed member power supply wiring section and the fixed member signal wiring section, the fixed member crosstalk prevention section being positioned between the fixed member power supply wiring section and the fixed member signal wiring section; and a recording head for recording a signal on a magnetic tape and a reproducing head for reproducing a signal recorded on the magnetic tape, wherein the signal transmitted between the rotating member and the fixed member of said transmission device comprises a recording signal supplied to said recording head and a reproduction signal obtained by said reproducing head, and wherein the power supply transmitted between the rotating member power supply wiring section of said rotating member and the fixed member power supply wiring section of said fixed member is used to amplify the reproduction signal obtained by said reproducing head.

6. A rotary magnetic head unit for recording a signal on an information recording medium in the form of a tape and for reproducing a signal from the information recording medium, said rotary magnetic head unit comprising:

a transmission device having a rotating member and a fixed member, said transmission device transmitting a power supply and a signal between the rotating member and the fixed member in a non-contact manner;

a rotating drum on which the rotating member of said transmission device is supported;

a fixed drum on which the fixed member of said transmission device is supported, the rotating member of said transmission device having a rotating member power supply wiring section for transmitting a power supply, a rotating member signal wiring section for transmitting a signal, and at least one rotating member crosstalk prevention section for preventing crosstalk between the rotating member power supply wiring section and the rotating member signal wiring section, the rotating member crosstalk prevention section being positioned between the rotating member power supply wiring section and the rotating member signal wiring section, and the fixed member of said transmission device having a fixed member power supply wiring section for transmitting a power supply between itself and the rotating member power supply wiring section. a fixed member signal wiring section for transmitting a signal between itself and the rotating member signal wiring section, and at least one fixed member crosstalk prevention section for preventing crosstalk between the fixed member power supply wiring section and the fixed member signal wiring section, the fixed member crosstalk prevention section being positioned between the fixed member power supply wiring section and the fixed member signal wiring section; and wherein the operation of an external oscillator for producing the power supply is stopped when the recording head is in contact with the magnetic tape.

7. A rotary magnetic head unit according to claim 5, wherein an external oscillator for producing the power supply converts a direct current into an alternating current, and wherein, when the alternating current of the power supply after transmission by the transmission device is converted into a direct current, a maximum frequency band of the alternating current is different from the frequency band of the signals.

8. A rotary magnetic head unit according to claim 5, wherein said rotating member and said fixed member are one of a set of disk-like members opposed to each other and a set of cylindrical members differing in size and coaxial with each other.

9. A rotary magnetic head unit according to claim 5, wherein, on the rotating member side, a subsection of the rotating member signal wiring section for transmitting a recording signal is placed between a subsection of the rotating member signal wiring section for transmitting a reproduction signal and the rotating member power supply wiring section, and wherein, on the fixed member side, a subsection of the fixed member signal wiring section for transmitting a recording signal is placed between a subsection of the fixed member signal wiring section for transmitting a reproduction signal and the fixed member power supply wiring section.

10. A rotary magnetic head unit according to claim 5, wherein, on the rotating member side, a subsection of the rotating member signal wiring section for transmitting a recording signal is connected directly to a recording head.

11. A rotary magnetic head unit according to claim 5, wherein, on the rotating member side, the rotating member crosstalk prevention section is placed between a subsection of the rotating member signal wiring section for transmitting a recording signal and the rotating member power supply wiring section, and wherein, on the fixed member side, the fixed member crosstalk prevention section is placed between a subsection of the fixed member signal wiring section for transmitting a recording signal and the fixed member power supply wiring section.

* * * * *